(12) United States Patent
Hirschberg

(10) Patent No.: US 12,210,727 B1
(45) Date of Patent: Jan. 28, 2025

(54) SWEEP ALGORITHM FOR OUTPUT OF GRAPHICAL OBJECTS

(71) Applicant: Everlaw, Inc., Oakland, CA (US)

(72) Inventor: David Hirschberg, Los Angeles, CA (US)

(73) Assignee: Everlaw, Inc., Oakland, CA (US)

( * ) Notice: Subject to any disclaimer, the term of this patent is extended or adjusted under 35 U.S.C. 154(b) by 91 days.

(21) Appl. No.: 17/548,377

(22) Filed: Dec. 10, 2021

(51) Int. Cl.
*G06F 3/0481* (2022.01)
*G06F 3/0482* (2013.01)
*G06F 7/24* (2006.01)
*G06T 11/20* (2006.01)

(52) U.S. Cl.
CPC .............. *G06F 3/0482* (2013.01); *G06F 7/24* (2013.01); *G06T 11/203* (2013.01); *G06T 2210/21* (2013.01)

(58) Field of Classification Search
CPC .... G06F 3/0481; G06F 3/0482; G06T 11/203; G06T 2210/21
See application file for complete search history.

(56) References Cited

U.S. PATENT DOCUMENTS

| | | | | |
|---|---|---|---|---|
| 9,635,046 | B2 * | 4/2017 | Spiro | H04L 63/1425 |
| 9,740,368 | B1 | 8/2017 | Love et al. | |
| 10,460,495 | B1 * | 10/2019 | Loer | G09B 29/005 |
| 2012/0320073 | A1 | 12/2012 | Mason | |

OTHER PUBLICATIONS

Javatpoint, "Singly Linked List vs Doubly Linked List," Dec. 1, 2020, Available https://web.archive.org/web/20201201183501/https://www.javatpoint.com/singly-linked-list-vs-doubly-linked-list (Year: 2020).*
Edwin H Jacox et al: "Spatial join techniques", ACM Transactions on Database Systems, ACM, New York, NY, US, vol. 32, No. 1, XP058185495, ISSN: 0362-5915, DOI: 10.1145/1206049.1206056 Chapter 3; Mar. 1, 2007; 44 pages.
PCT Application No. PCT/US22/52075; International Search Report and Written Opinion of the International Searching Authority; Apr. 21, 2023; 14 pages.

* cited by examiner

*Primary Examiner* — Alvin H Tan
(74) *Attorney, Agent, or Firm* — Banner & Witcoff, Ltd.

(57) ABSTRACT

Various aspects of the subject technology relate to systems, methods, and machine-readable media for outputting overlapping graphical objects via a graphical user interface. Various aspects can include determining a plurality of shapes as a subset of a set of shapes associated with the graphical objects. Aspects can also include determining intersections of the plurality of shapes based on a maximum shape dimension (e.g., height) and based on assigned weights to each of the set of shapes. Aspects can include determining a visibility parameter of each shape of the plurality of shapes based on whether each shape intersects with one or more other shapes. Aspects can include providing instructions to display the graphical user interface at a viewport parameter according to the visibility parameter and instructions to output labels of the graphical objects bounded by the set of shapes based on the viewport parameter.

20 Claims, 9 Drawing Sheets

SWEEP ALGORITHM FOR OUTPUT OF GRAPHICAL OBJECTS

TECHNICAL FIELD

The present invention generally relates to outputting overlapping graphical objects via a graphical user interface, and more particularly to a sweep algorithm for rendering graphical objects during zooming in and out of the graphical user interface.

BACKGROUND

Certain tasks can require analysis of a very large quantity of data, such as documents. For example, many documents can be produced for analysis during a legal proceeding, such as hundreds of thousands or even millions of documents. A graphical user interface that displays graphical objects representing the documents can be used to facilitate organization, visualization, and analysis of these numerous documents. A zoom function (e.g., zooming in and zooming out) of the graphical user interface can be used to view the organized documents in more or less detail depending on the zoom function. Rendering the graphical user interface on a client device or user device can be slow due to the high quantity of documents, which can annoy users of the graphical user interface. Efficiently sweeping through and determining intersections of a subset of shapes corresponding to the graphical objects can advantageously increase the speed of rendering.

SUMMARY

In accordance with the present invention, millions of prioritized and overlapping graphical elements can be selected so as to present elements without overlap fast enough to provide smooth motion video as the elements move, e.g., within one sixtieth of a second. Various aspects of the subject technology relate to systems, methods, and machine-readable media for outputting overlapping graphical objects (e.g., documents, non-overlapping text for animation) via a graphical user interface. By efficiently determining which overlapping graphical objects with associated labels to output for a particular viewport parameter (of the graphical user interface, users can navigate the graphical user interface more quickly and effectively. In particular, a specific quantity of documents represented by graphical objects can form a cluster that is bounded by a shape such that the graphical user interface contains multiple shapes used to render a subset of clusters with associated labels for each frame depending on the particular viewport parameter. A sweep algorithm can advantageously be used to more efficiently determine intersections of the multiple shapes for determining which graphical objects, clusters and/or labels to display at the particular viewport parameter.

The sweep algorithm beneficially can involve calculation of intersections for a subset of the multiple. The reduction in intersection calculations advantageously can reduce processing cost and time complexity to realize an improvement in the graphical user interface. The computing system that implements the sweep algorithm is an improved computing system that can enable improved graphical user interface rendering rate, graphical user interface refresh rate, and data transmission across client and server computing architectures. For example, the rendering rate can increase from 1 frame per second (FPS) to 60 FPS, based on the sweep algorithm of the present invention. As such, the improved computing systems of the subject technology can enable improved and/or faster zooming and navigation of the graphical user interface for analyzing overlapping graphical objects.

According to one embodiment of the present invention, a computer-implemented method for outputting overlapping graphical objects via a graphical user interface is provided. The method includes determining a plurality of shapes as a subset of a set of shapes that are associated with the overlapping graphical objects. The method also includes determining intersections of the plurality of shapes based on weights assigned to each shape of the set of shapes and based on a maximum dimension of the set of shapes. The method also includes determining a visibility parameter of each shape of the plurality of shapes based on whether each shape intersects with one or more other shapes of the plurality of shapes. The method also includes providing instructions to display the graphical user interface at a viewport parameter (e.g., a zoom level) according to the visibility parameter. The method also includes providing instructions to output labels of the overlapping graphical objects bounded by the set of shapes based on the viewport parameter of the graphical user interface. As used herein, the maximum dimension can refer to a maximum height, maximum width, etc.

According to one embodiment of the present invention, a system is provided including a processor and a memory comprising instructions stored thereon, which when executed by the processor, cause the processor to perform a method for outputting overlapping graphical objects via a graphical user interface. The method includes determining a plurality of shapes as a subset of a set of shapes that are associated with the overlapping graphical objects. The method also includes determining intersections of the plurality of shapes based on weights assigned to each shape of the set of shapes and based on a maximum dimension of the set of shapes. The method also includes determining a visibility parameter of each shape of the plurality of shapes based on whether each shape intersects with one or more other shapes of the plurality of shapes. The method also includes providing instructions to display the graphical user interface at a viewport parameter according to the visibility parameter. The method also includes providing instructions to output labels of the overlapping graphical objects bounded by the set of shapes based on the viewport parameter of the graphical user interface.

According to one embodiment of the present invention, a non-transitory computer-readable storage medium is provided including instructions (e.g., stored sequences of instructions) that, when executed by a processor, cause the processor to perform a method for outputting overlapping graphical objects via a graphical user interface. The method includes determining a plurality of shapes as a subset of a set of shapes that are associated with the overlapping graphical objects. The method also includes determining intersections of the plurality of shapes based on weights assigned to each shape of the set of shapes and based on a maximum dimension of the set of shapes. The method also includes determining a visibility parameter of each shape of the plurality of shapes based on whether each shape intersects with one or more other shapes of the plurality of shapes. The method also includes providing instructions to display the graphical user interface at a viewport parameter according to the visibility parameter. The method also includes providing instructions to output labels of the overlapping graphical objects bounded by the set of shapes based on the viewport parameter of the graphical user interface.

According to one embodiment of the present invention, a computer-implemented method for outputting overlapping graphical objects via a graphical user interface is provided. The method includes receiving a linked list of a set of shapes associated with the overlapping graphical objects in the graphical user interface, wherein the set of shapes are defined according to a two dimensional Cartesian coordinate system. The method also includes calculating a maximum height of the set of shapes used to render the graphical user interface. The method also includes determining a plurality of shapes as a subset of a set of shapes that are associated with the overlapping graphical objects. The method also includes determining intersections of the plurality of shapes based on weights assigned to each shape of the set of shapes and based on a maximum dimension of the set of shapes. The method also includes determining a visibility parameter of each shape of the plurality of shapes based on whether each shape intersects with one or more other shapes of the plurality of shapes. The method also includes providing instructions to display the graphical user interface at a viewport parameter according to the visibility parameter. The method also includes providing instructions to output labels of the overlapping graphical objects bounded by the set of shapes based on the viewport parameter of the graphical user interface.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
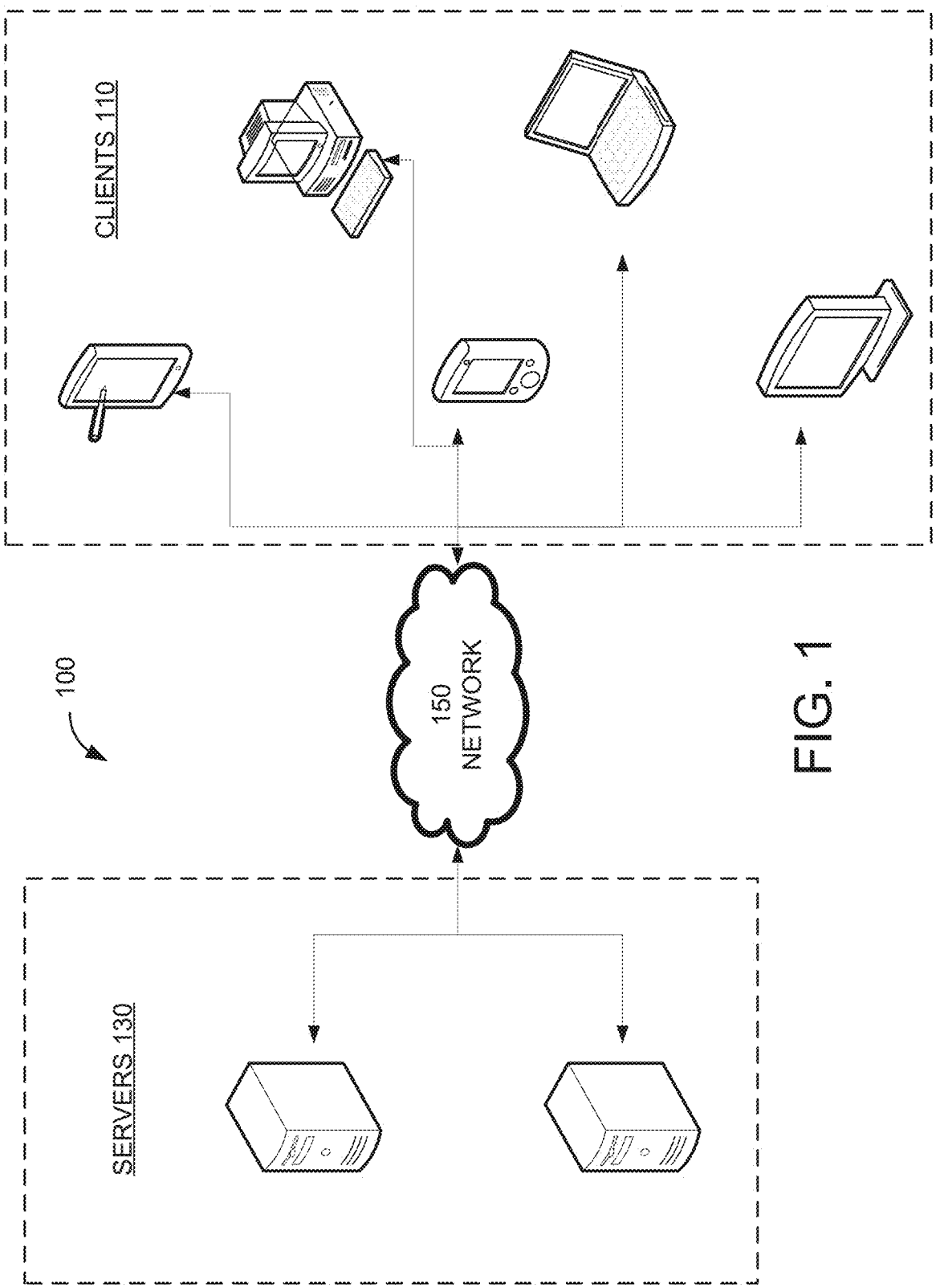
FIG. 1 is a block diagram of a device operating environment with which aspects of the present invention can be implemented.

In one or more implementations, not all of the depicted components in each figure can be required, and one or more implementations can include additional components not shown in a figure. Variations in the arrangement and type of the components can be made without departing from the scope of the subject disclosure. Additional components, different components, or fewer components can be utilized within the scope of the subject disclosure.

DETAILED DESCRIPTION

The disclosed systems, methods, and machine-readable media address a problem in traditional computing platforms for rendering graphical user interfaces, namely inefficient and inadequate navigation and zooming (e.g., rendering a viewport parameter for the graphical user interfaces). This is a problem specifically arising in the realm of computer technology. The present invention enables millions of prioritized and overlapping graphical elements can be selected so as to present elements without overlap fast enough to provide smooth motion video as the elements move, e.g., within one sixtieth of a second. The problem is addressed by providing a solution also rooted in computer technology, namely, by providing improved navigation, rendering frame rate, refresh rate, and data transmission within a computer network for reducing latency and increasing responsiveness of graphical user interfaces via an improved sweep algorithm. The solution can improve communication systems and graphical user interfaces by increasing navigation and user interaction with the graphical user interfaces such as adjusting between different viewport parameters (e.g., different zoom levels).

For example, the solution can improve zooming onto overlapping graphical objects rendered via shapes containing labels of graphical objects and/or clusters. The zooming can be more compressed or more diffuse shapes based on the different viewport parameters. The solution can involve more efficiently determining which shapes should be displayed in various display viewports (e.g., panning and zooming to change display windows) based on the varying compression or diffusion of the shapes via a determined subset of shape intersections. The improved sweep algorithm can involve improved traversal via a doubly linked list of the shapes for more effectively determining shape intersections and determining which cluster labels to display. As disclosed herein, the shapes in the doubly linked list can also be stored in an array for maintaining random access for performing a binary search. During performance of the binary search, shapes in the array and/or the linked list can be de-referenced relative to the traversal but remain stored in their respective lists. That is, the de-referencing enables quicker and more efficient iteration of candidate intersections via traversal of links of the linked list (e.g., traversing only relevant shapes) for determining the shape intersections. As such, application of the sweep algorithm herein enables running the binary search to find the starting shape for iteration of candidate intersections, and by following our links for traversal of only relevant shapes relevant shapes for reduced time complexity (e.g., inverse Ackerman ($O(\alpha(n))$) time complexity of the sweep, $O(1)$ constant time complexity, etc.)

The computing systems and/or networks of the subject technology can enable effectively handling and processing of thousands or millions of shapes in a time duration of $\frac{1}{60}^{th}$ of a second. The solution can involve improved server responses to client requests in the computing systems and/or networks of the subject technology for adjusting viewport parameters of the graphical user interfaces. In this way, the subject technology provides advantages such as but not limited to: improved network communication and data transfer for more effective data visualization, improved user interface for improved user navigation, improved servers for rendering visual displays, etc. The improved server responses can address the technical challenge of having a significant quantity of shapes needed to be processed in a short period of time for rendering the graphical user interfaces.

FIG. 1 is a block diagram of a device operating environment with which aspects of the present invention can be implemented. FIG. 1 illustrates an exemplary network architecture 100 to provide a computing platform (e.g., data cluster platform) to manage overlapping graphical objects, according to some embodiments. Managing overlapping graphical objects can involve mechanisms for uploading data (e.g., documents), grouping overlapping graphical objects such as grouping into clusters, determining shapes for bounding clusters, determining intersections of the shapes, rendering and/or outputting clusters and/or shapes via graphical user interfaces, navigating graphical user interfaces based on user input, etc. As an example, the data cluster platform can be configured to output data clusters or representations of data clusters to be displayed on a graphical user interface (GUI) of a user device. The user device can be a mobile device, one of the client devices 110, etc. The data cluster platform can be configured to host, output, and/or display related documents or indications thereof on the GUI, such as for documents received in the course of a legal proceeding.

Each user of the data cluster platform can create, access, and manage an individual version of the GUI, such as via corresponding data clusters rendered on a corresponding client device 110, for example. For each individual GUI, the corresponding user can select various parameters, such as a viewing parameter (e.g., viewport parameter), color coding parameter, search parameter (e.g., to determine what data and/or clusters to display), etc. The GUI can be hosted on a network such as the network 150, which can be the Internet. In this way, the GUI can be accessed in an online or offline manner via the network 150 such as via an identifier (e.g., web address, website, uniform resource location (URL)) of a website/webpage on the World Wide Web (WWW) accessible via the Internet. The offline manner can involve accessing a cached, previously saved offline version of the website/webpage, for example. The data cluster platform can include a network architecture by which user devices or client devices 110 operated by various users can access the data cluster platform to visualize, analyze, evaluate, etc. the clusters and data displayed on the GUI.

The network architecture includes one or more client devices 110 and one or more servers 130 which are communicatively coupled through the network 150. The network 150 can include a wired network (e.g., via fiber optic or copper wire, telephone lines, and the like) or wireless network (e.g., a cellular network, radio-frequency (RF) network, Wi-Fi, Bluetooth, and the like). The client devices 110 can be any one of a mobile device, a laptop, a desktop, a tablet (e.g., palm or pad) device, a television, a display device, etc. The client devices 110 can be controlled by a user to manage data cluster content uploaded onto or hosted by the data cluster platform, such as via the mechanisms described herein. Multiple client devices 110 can have access to the data cluster platform hosted by the servers 130 via an online or offline connection, such as a wireless connection, wired connection, ad hoc connection, mobile connection, satellite connection, etc. Each of the servers 130 can be a computing device such as part of a cloud computing server including one or more desktop computers or panels mounted on racks, etc. The panels can include processing boards and also switchboards, routers, and other network devices.

The servers 130 can include memory to determine, host, manage, analyze, and/or display uploaded content being clustered and output via the data cluster platform, according to various illustrative embodiments of the present invention. The computing devices of the servers 130 can comprise processors to execute various algorithms and/or modules for controlling content, settings, or parameters of clusters accessed by users via the data cluster platform. For example, the computing devices of the servers 130 can execute a specific sweep algorithm to determine how to output data clusters via the GUIs of each of the client devices 110. As an example, the computing devices of the servers 130 can efficiently determine a subset of shape intersections of shapes used to render the GUIs, which can advantageously increase the speed of zooming in and out, refresh rate, and/or rendering rate for the GUIs. The subset of shape intersections can refer to a subset of relevant shapes corresponding to labeled clusters that should be visible for a particular viewport parameter. To elaborate further, shapes can intersect that certain lower weighted shapes should be hidden or invisible to a user/viewer navigating their corresponding GUI at the particular viewport parameter. The GUI can be accessible via an application being executed on the one or more client devices 110 and hosted/provided via the servers 130.

Figure 2:
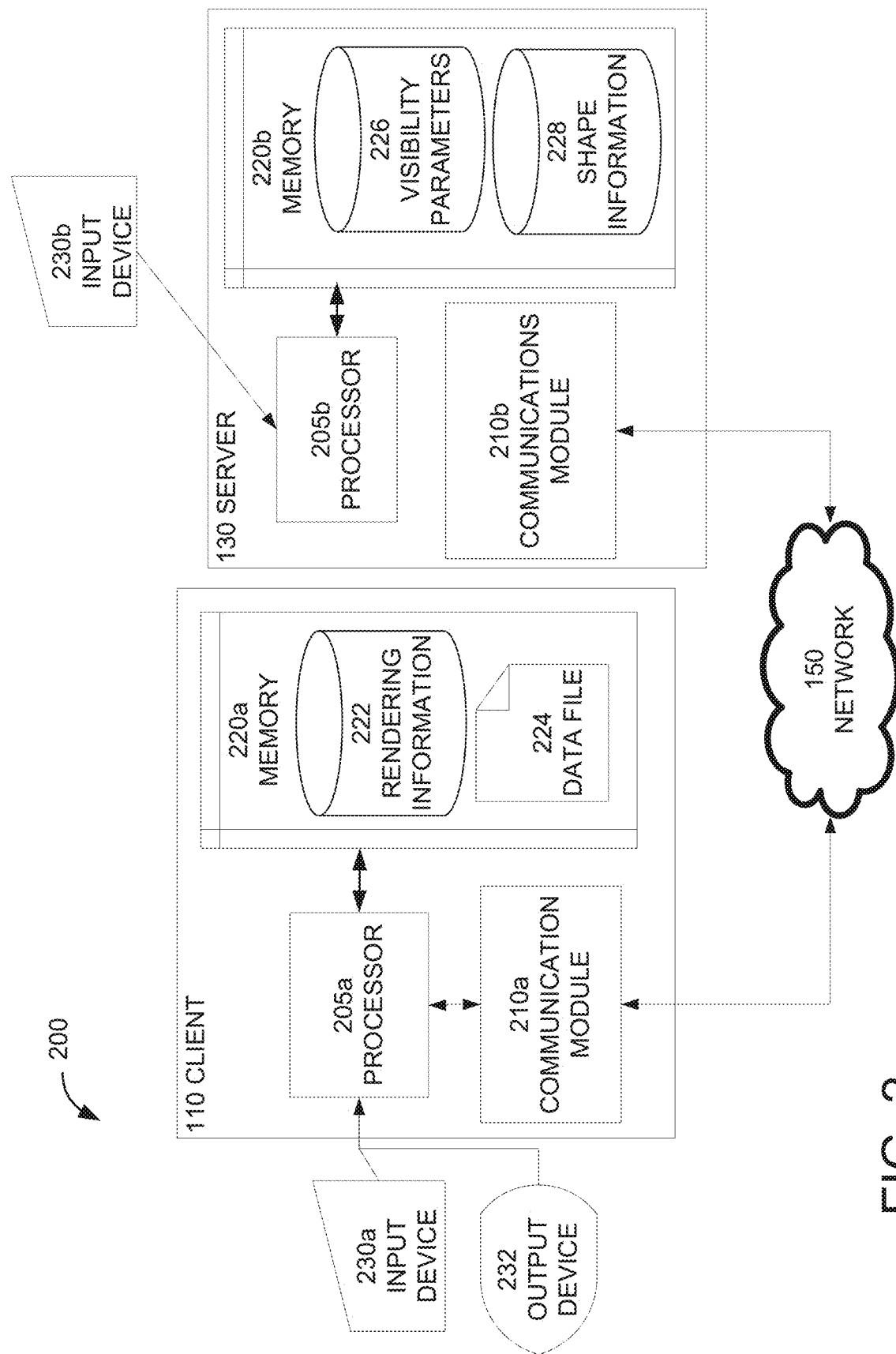
FIG. 2 is a block diagram of an example computing network of an example content platform for outputting data clusters, according to certain aspects of the present invention.

FIG. 2 is a block diagram of an example computing network 200 of an example data cluster platform for sharing and outputting content, according to certain aspects of the present invention. FIG. 2 illustrates a client device (of one or more client devices) 110 and a server (of one or more servers) 130 of the example computing network 200 for use in the network architecture of FIG. 1, according to some embodiments. Each of the one or more client devices 110 and the one or more servers 130 can access each other and other devices in the network 150 via corresponding communications modules 210a-210b. The communications modules 210a-210b can each include radio hardware and software such as RF antennas, analog circuitry, digital to analog conversion circuits, digital signal processing circuitry, etc. The client device 110 and server 130 depicted in FIGS. 1-2 can each include a processor 205a-205b and memory 220a-220b, respectively.

Generally, the client device 110 and the server 130 comprise computing devices including at least: the memory 210a-210b storing instructions and processors 205a-205b configured to execute the instructions to perform, at least partially, one or more steps as described in methods disclosed herein. For example, the memory 110a of the client device 110 can be used to gain access to a browser, application, or device component corresponding to the data cluster platform hosted by the server 130. The client device 110 can be used by a user of the data user platform, such as to access a data cluster graphical user interface (GUI) screen rendered via the client device 110. For example, the client device 110 can be coupled to at least one input device 230a and output device 232 accessible by the user. The input device 230a can include a mouse, keyboard, a pointer, a stylus, a touchscreen display, microphone, voice recognition software, graphical user interface (GUI), etc. The output device 232 can include a display (e.g., the same touchscreen display as the input device), a speaker, an alarm, and the like.

As an example, the user can control and manage data via the input device 230a, such as uploading documents to be clustered for output to the data cluster GUI screen. he user can use mechanisms for uploading data onto the data cluster platform for purposes such as sharing data, creating data, deleting data, searching/filtering for data, etc. The client device 110 or the server 130 can execute algorithms for clustering sets of related data into clusters, such as based on a machine learning clustering algorithm. For example, the machine learning clustering algorithm can be a k-means, mean shift, Density-Based Spatial Clustering of Applications with Noise (DBSCAN), Expectation-Maximization (EM) Clustering using Gaussian Mixture Models (GMM), Balanced Iterative Reducing and Clustering using Hierarchies (BIRCH), and/or other suitable clustering algorithm. As an example, each cluster of the clusters of related data can represent 10, 50, 100, or some other suitable number of related documents.

Each cluster can have one or more labels that can be indicative of the subject matter of the corresponding cluster. The user can specify clustering parameters and other user preferences via the input device 230a, such as the quantity of documents in a cluster, color coding of clusters, labeling of clusters, GUI screen viewing parameters, search parameters etc. The output device 232 can output the cluster GUI screen on the client device 110 according to the associated user preferences and specified clustering parameters so that the associated user can view, navigate, and/or otherwise manipulate the GUI screen and the clusters/data displayed on the GUI screen. The output device 232 display selected clusters or data that can be searched or switched between, such as via the input device 230a controlled by the user. For example, the user can use the input device 230a to control a cursor that can hover over clusters or data (e.g., which can be indicated via highlighting on the GUI) to select or view more information corresponding to selected clusters, data, and/or labels. For example, the user can use the input device 230a to select a viewport parameter (e.g., zooming in or out of the GUI at certain percentage zoom/view) of the GUI screen at which the server 130 can determine which clusters or associated shapes to display at the selected viewport parameter.

The processor 205a of the client device 110 can be used to operate the client device 110, such as to execute applications and functions thereof rendered on the client device 110. The applications can include an application corresponding to the data cluster platform. In this way, the user can use the input device 230a (e.g., to send user inputs) to cause the processor 205a to execute machine executable instructions for uploading data being clustered onto the data content platform, as well as select or perform other functions associated with analyzing, navigation, or otherwise manipulating a visual representation of the data and/or clusters. For example, the user can view clusters on the GUI screen, select clusters, label clusters, and/or data to view more information associated with the corresponding cluster/data/label, navigate to portions of the GUI screen rendered on the client device 110, adjust a viewport parameter of the GUI screen, change color coding, change the quantity of cluster/data/labels being displayed, etc based on instructions executed by the processor 205a. The processor 205a can track or determine user preferences for outputting the GUI screen on a display screen of the client device 110. For example, the processor 205a can control refresh rate or rendering rate according to various visibility parameters and user preferences. For example, the visibility parameters can define whether a shape and corresponding cluster should be shown as hidden or visible based on intersections with other shapes/clusters. As an example, the visibility parameters can define that a lower weight rectangle is visible even if intersecting with a higher weight rectangle due the higher weight rectangle being marked (e.g., already marked) as hidden.

The data file 224 stored in the memory 220a can include application settings, files, and data specific to the associated user of the client device 110, such as bookmarks, saved sessions, search history, etc. associated with a session in which the GUI screen is rendered. The data files 224 can contain data indicative of user specific activity on a computer application used to define clusters and data used for rendering the GUI screen illustrating these defined clusters and data. Rendering the GUI screen can also be based on rendering information contained in the database 222. For example, the information in the database can include visibility parameters and user preferences used by the computer application to determine a customized GUI screen for the associated user, such as for rendering data clusters (e.g., of data yielded by a user specified search) at a selected zoom percentage with data coded by a user specified color along with other user specified visual appearance preferences. For example, the zoom percentage can be a percentage expressing an extent that the GUI screen should be zoomed in such as 50%, 100%, 300%, 500%, 620%, etc. The database 222 and data file 224 can be used by the processor 205a of the client device 110 to determine how to classify data into clusters and which clusters to display. In particular, the visibility parameters and user preferences can define how the client device 110 executing the computer application should output hidden or visible clustered data (e.g., which clusters should be hidden and which should be visible) for a specified zoom percentage and user specified visual characteristics. The visibility parameters can be received by the client device 110 from the server 130 via visibility parameter information stored in the database 226.

The server 130 can determine a subset of intersections of a total quantity of shapes used to render the clusters on the GUI screen, which can improve the efficiency of operation of the server 130. In particular, the processor 205b of the server 130 can execute an improved sweep algorithm so that the server 130 can send data for rendering the GUI screen to the client device 110 with an increased speed of zooming in and out, refresh rate, and/or rendering rate available to the user. The parameters of the sweep algorithm can be defined by a developer using the input device 230b. For example, the developer can define a weighting scheme to assign weights to each of a collection of shapes used to render the clusters. The assigned weights can be part of the visibility parameters stored in the database 226. The assigned weights can be used as part of execution of the sweep algorithm to determine which shapes of multiple intersecting shapes should be visible. As an example, the visibility parameters can be used by the processor 205b of the server 130 to determine which clusters corresponding to certain weighted shapes should be visible and with what color.

As an example, for intersecting shapes, the higher weighted shapes can be visible and the lower weighted shapes can be invisible or hidden. Additionally or alternatively, lower weight shapes can be visible if they intersect with higher weight shapes already marked as hidden during shape traversal via the sweep algorithm. The visible shapes as indicated by the sweep algorithm executed by the server 130 can be used to determine which corresponding clusters are visible and/or labeled on the GUI screen rendered by the client device 110. The shape information stored in the database 228 can be used to determine the visual appearance of the shapes and/or clusters. For example, the shapes can be rectangles. For example, the clusters can be visible as varying sized polygons (e.g., with varying number of sides) at different colors depending on their corresponding subject matter. The sweep algorithm can be executed by the server 130 to determine which cluster labels of which shapes should be visible on the GUI screen. The cluster labels can be visible if they correspond to higher weighted intersections at a certain position relative to the selected zoom percentage. As an example, the visibility parameters and shape information respectively stored in the databases 226, 228 can be retrieved by the server 130 and sent to the client device 110 to determine which cluster labels should be visible. For example, the client device 110 can render the GUI screen with clusters of varying size and certain visible labeled clusters having three visible labels. The clusters can contain dots that are each representative of one hundred documents, for example.

Although the above description describes certain functions being performed by the processor 205a of the client device 110 and other certain functions being performed by the processor 205b of the server 130, all of the functions described herein can be performed by the client device 110 and/or the server 130 in some other alternative division of labor. That is, the processors 205a, 205b could perform more or less of the functions (e.g., portions of the sweep algorithm) described above. In some embodiments, some or part of the client device 110 can be co-located with the server 130. That is, the server 130 can be remote from or both the client device 110 and the server 130 can be part of the same larger computing system, network, or architecture.

Figure 3:
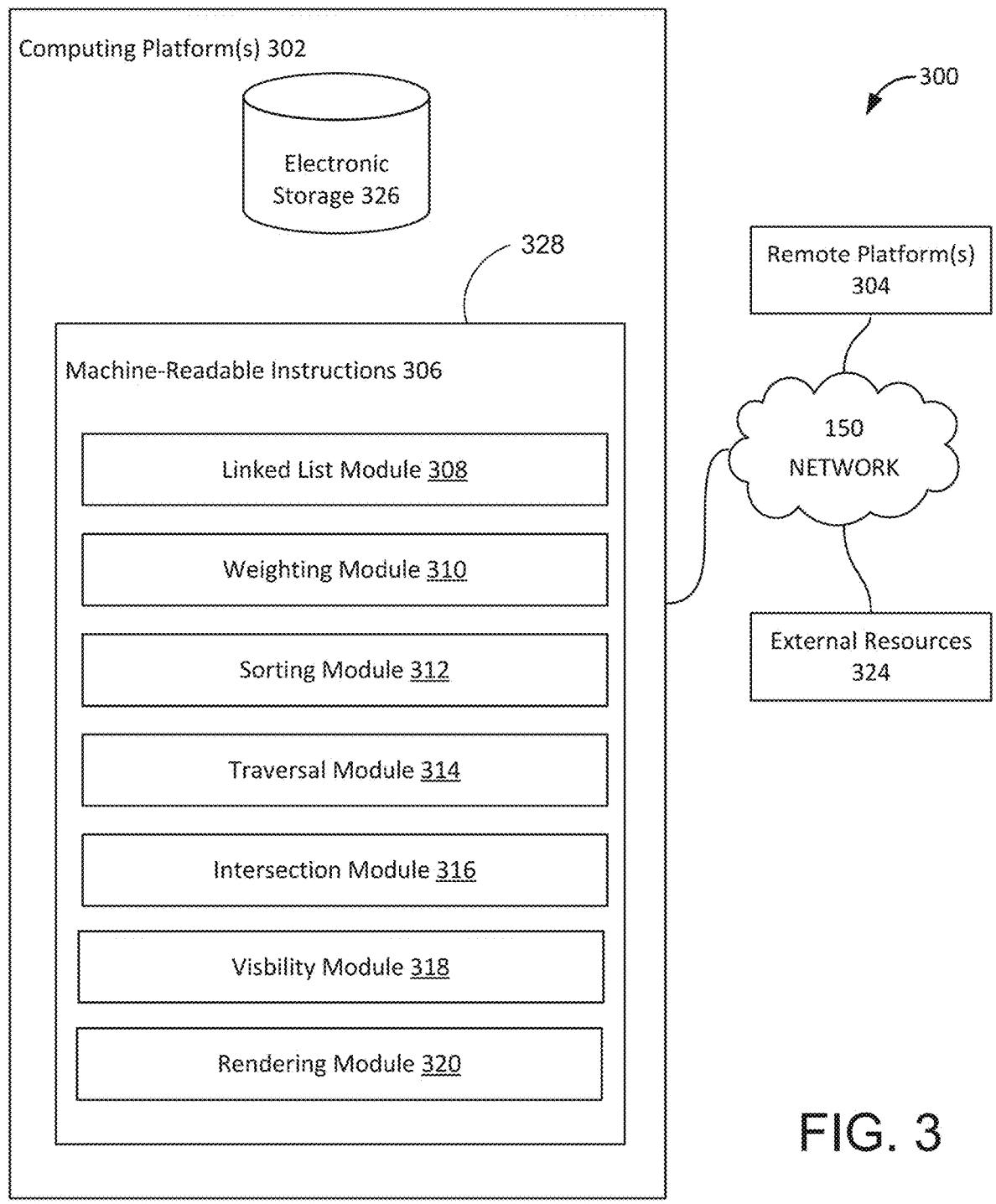
FIG. 3 is a block diagram illustrating an example computer system (e.g., representing both client and server) with which aspects of the subject technology can be implemented.

FIG. 3 is a block diagram illustrating an example computer system 300 (e.g., representing both client and server) with which aspects of the subject technology can be implemented. The system 300 can be configured for outputting overlapping graphical objects via a graphical user interface (GUI) of a data cluster platform, according to certain aspects of the disclosure. In some implementations, system 300 can include one or more computing platforms 302. The computing platform(s) 302 can correspond to a server component of a content computing platform, which can be similar to or the same as the server(s) 130 of FIGS. 1-2. As an example, the computing platform(s) 302 can comprise processor(s) 328 that can be similar or the same as processor 205b and comprise electronic storage 326 that can include databases such as databases 226, 228.

The computing platform(s) 302 can be used for association of shapes with the overlapping graphical objects and determination of intersections of a subset of the shapes. As an example, the shapes can form bounding boxes of one or more groups of graphical objects (e.g., data clusters of graphical objects) which can be labeled. Each bounded cluster can have one label or more than one label that represents the clusters. As an example, a shape can spatially represent three labels (e.g., words) that each represent a cluster. That is, each cluster can have one label. The text of the labels and/or shapes can intersect other labels and/or shapes such that certain label text is not readable or visible on the GUI. The computing platform(s) 302 can use calculated intersections to determine which labels to render on the GUI. In this way, the computing platform(s) 302 can be configured to execute algorithms such as an improved sweep algorithm and/or machine learning algorithms to determine which graphical object group label (e.g., cluster label) text should be visible when the GUI is rendered for a particular viewport parameter on a display screen of a user device such as a client device (e.g., client device 110) of the remote platform(s) 304. Execution of the improved sweep algorithm by the computing platform(s) 302 can be used to improve a frame rendering rate of rendering the GUI on the display screen for the remote platform(s) 304, such as from two to three rendered frames per second (FPS) to thirty or sixty FPS, for example. The improved frame rendering rates can be indiscernible to users such that users advantageously can not notice any lag or latency in loading while the GUI is being rendered/adjusted in response to changing the particular viewport parameter (e.g., increasing or decreasing a zoom percentage) for the GUI.

The computing platform(s) 302 can be configured to communicate with one or more remote platforms 304 according to a client/server architecture, a peer-to-peer architecture, and/or other architectures. Remote platform(s) 304 can be configured to communicate with other remote platforms via computing platform(s) 302 and/or according to a client/server architecture, a peer-to-peer architecture, and/or other architectures. Users can access system 300 via remote platform(s) 304. In this way, the remote platform(s) 304 can be configured to cause output of the GUI containing data clusters bounded by polygon shapes on corresponding display screen(s) of user device(s) of the remote platform(s) 304. As an example, the remote platform(s) 304 can access an application for the data cluster platform to input data (e.g., documents) to be clustered and organized for being visualized as clusters on the GUI. The GUI can be rendered by the remote platform(s) 304 according to associated user preferences and visibility parameters. As an example, the computing platform(s) 302 can communicate with the remote platform(s) 304 to implement a zooming function by enabling users to zoom in and out of the labeled clusters displayed via the GUI. For example, the labeled clusters and/or corresponding shapes can become more clumped together or spread as the GUI is zoomed in or zoomed out. Depending on the viewport parameter, visibility parameters, and/or user preferences, the computing platform(s) 302 can efficiently determine which labels should be visible.

The computing platform(s) 302 can be configured by machine-readable instructions 306. The machine-readable instructions 306 can include one or more instruction logics. The instruction logic can include computer program logics. As used herein, "logic" refers to (i) logic implemented as machine-readable instructions and/or data within one or more computer processes and/or (ii) logic implemented in electronic circuitry. The instruction logic can include one or more of linked list logic 308, weighting logic 310, sorting logic 312, traversal logic 314, intersection logic 316, visibility logic 318, rendering logic 320, etc.

The linked list logic 308 can be configured to receive a linked list (e.g., doubly linked list) of shapes for traversal. A doubly linked list can refer to every shape in the linked list being linked to a previous shape and a next shape in the linked list. By way of non-limiting example, the shapes can be rectangles, polygons, circles, and/or any other suitable shape. Traversal of the linked list can be part of executing the sweep algorithm by the computing platform(s) 302, such as for determining intersections of the shapes to determine which cluster labels should be visible for a given (e.g., selected) viewport parameter. As an example, the sweep algorithm can involve the computing platform(s) 30 selecting a reference shape from the linked list based on an assigned weight (e.g., iterating to the next shape in the linked list or other sorted list) and to check for intersections with the reference shape. For example, the search can be a binary search.

The links of the linked list can be updated by the linked list logic 308 such as based on a maximum height (or maximum width) of the shapes in order to more efficiently calculate intersections (e.g., only calculating a subset of the total quantity of intersections of tall the shapes) via execution of an intersection component of the sweep algorithm by the intersection logic 316. In particular, the linked list logic 308 can update the previous and next links of a particular shape to its previous shape and next shape based on the maximum height and calculated intersections so that other shapes that cannot intersect with the particular shape are no longer part of traversal by the traversal logic 314, which advantageously improves the frame rendering rate of the GUI at the given viewport parameter. For example, the particular shape that is no longer part of traversal does not get recalculated for intersections with other shapes after the particular shape is removed from the linked list. The particular shape being removed nonetheless can still be stored in an array of shapes, as discussed herein. Advantageously, the linked list logic 308 need only calculate shape intersections for a subset of the linked list to enable faster refreshing, rendering, and navigating of the GUI.

The weighting logic 310 can be configured to rank the shapes by weight. An assigned weight for each of the shapes can be used to order the shapes in a weight sorted array of shapes. For example, the weighting logic 310 can sort the shapes in the weight sorted array in descending order from highest weight to lowest weight. The weight sort array can be used to select reference shapes for traversal through the linked list. The weight assigned to each shape can be determined based on a variety of criteria, such as a consideration that is relevant to how data (e.g., graphical objects) are being clustered to from the clusters. As an example, the weight can correspond to a number of documents (e.g., that form the clusters) represented by the shape. As an example, the weight can be defined based on data/document density, a percentage of the documents fitting a set of parameters, etc. The parameters can be based on set filters or thresholds, such as a quantity of documents of the percentage of documents marked as relevant, a quantity of documents predicted to be relevant, metadata containing information marked as important, number of documents viewed by people, pages above or below a threshold, or documents containing words or tokens that match some criteria. In general, the weight can be used to measure density or variance based on desired characteristics or data being represented, such as documents, images, tweets, entities, etc. The weight sorted array of shapes determined by the linked list logic 308 can be used to determine an order for traversing the linked list by the traversal logic 314, such as starting from highest weighted shapes.

The sorting logic 312 can be configured to sort the linked list (e.g., doubly linked list) output by the linked list logic 308. For example, the sorting logic 312 can sort the shapes into two collections. As an example, the sorting logic 312 can sort the shapes into the doubly linked list by ascending values along a y-axis. In particular, the shapes can be rectangles defined by a y0 coordinate defined as the vertical distance from a top left origin to the top of a given rectangle and a y1 coordinate defined as the vertical distance from the top left origin to the bottom of the given rectangle. The top left origin can be a top left corner of the GUI containing the rectangles. In this way, the top left origin can represent point (0, 0) along an x-axis and the y-axis and coordinates of x and y increase from left to right and top to bottom respectively. The rectangles can represent a bounding box of clusters represented by polygon shapes that can be labeled or a bounding box of labels. The sorting logic 312 can sort the doubly linked list as the first collection by ascending values of y0 coordinates of the rectangles from top to bottom, with links to the corresponding next and previous rectangle in the doubly linked list. The sorting logic 312 and/or the weighting logic 310 can sort the second collection as the weight sorted array of shapes in descending order from the highest weight to the lowest weight. The sorting logic 312 and/or the weighting logic 310 can alternatively sort the second collection from the lowest weight to the highest weight, sort by traversal of ascending values of x0 coordinates (e.g., with calculation of a maximum width rectangle instead of maximum height), and/or some other suitable sorting mechanism.

The traversal logic 314 can be configured to traverse forwards and backwards through the linked list from the linked list logic 308 such as to iterate through the linked list to check for intersections with the reference shape and to possibly mark shapes as hidden, such as based on intersection with a higher weighted reference shape. The traversal logic 314 can execute iterations through the weight sorted array of shapes in which the shapes are selected as reference shapes in order from highest weight to lowest weight. The executed iterations can be iterated over a previous pointer or a next pointer. During a first iteration, if the highest weighted shape is not marked as hidden, the traversal logic 314 and/or linked list logic 308 can traverse or search (e.g., binary search) through the linked list to find a shape having a y0 value that is greater than and closest to the y1 of the highest weighted shape (current reference shape). That is, the binary search can be performed on the weight sorted array of shapes form of the linked list to obtain the reference shape to rapidly enter the linked list (e.g., at a O(1) constant time complexity) and only traverse relevant shapes.

The found shape is analyzed by the intersection logic 316 to determine whether the found shape intersects with the highest weighted shape. If the found shape intersects, then the traversal logic 314 can determine whether the found shape has a lower weight. In this situation, the found shape has a lower weight because it is being compared to the current reference shape that is the highest weighted shape, so the found shape would be marked as hidden during output of the GUI by the remote platform(s) 304. When the found shape is marked as hidden, its links can be changed such that the found shape's previous shape has a next link pointing to the found shape's next shape and the found shape's next shape has a previous link pointing to the found shape's previous shape. Accordingly, the highest weighted shape need not be compared against in subsequent traversals. In this way, during future iterations or traversals by the traversal logic 314 when the highest weighted shape is selected as a candidate shape, the found shape no longer would be considered in intersection analysis, which increases the efficiency of the sweep algorithm executed by the computing platform(s) 302.

Instead, intersection analysis proceeds directly to the shape linked to the found shape at the previous pointer of the found shape. If the found shape is determined by the intersection logic 316 not to intersect with the highest weighted shape, then the traversal logic 314 can transition to another candidate shape (e.g., the shape at the previous pointer of the found shape) to compare for intersection with the current reference shape. Analysis of the selected current reference shape can terminate when the traversal logic 314 determines that the y0 value of the current candidate shape plus the maximum height of the shapes is less than the y0 value of the current reference shape. This is because it is impossible for any of the previous shapes to the current candidate shape to intersect with the current reference shape, because shapes linked to the found shape at previous pointers in the linked list have smaller y0 values than the current candidate shape.

Once analysis of the selected current reference shape terminates, the traversal logic 314 can select the next highest weighted shape (the next shape selected by transitioning through the weight sorted array of shapes in the direction from highest weight to lowest weight) as the current reference shape. If the selected next highest weighted shape is not marked as hidden, then the traversal logic 314 repeats the iterative comparison of the new current reference shape to the list of candidate shapes for shape intersection analysis. If the selected next highest weighted shape is marked as hidden, then the traversal logic 314 can consider analysis of the selected next highest weighted shape as completed and move onto the next shape in the weight sorted array of shapes for selection as the next current reference shape. In this way, the traversal logic 314 beneficially can reduce the time complexity cost (e.g., less time complexity than N log (n)+s time complexity in which N equals the number of clusters and s equals the number of intersections of the clusters) associated with executing the sweep algorithm.

The intersection logic 316 can be configured to determine intersections of a plurality of shapes via execution of the sweep algorithm by the computing platform(s) 302. Unless each shape intersects with every other shape, the intersection logic 316 advantageously can only calculate intersections for a subset of all the shapes rendered on the GUI (e.g., the total set of shapes associated with the overlapping graphical objects). That is, the intersection logic 316 can determine a plurality of a subset of all the shapes associated with the overlapping graphical objects. By calculating intersections of a subset of the total set of shapes, the intersection logic 316 can be configured to reduce the time complexity cost and increase GUI rendering speed by the rendering logic 320. When the intersection logic 316 determines an intersection of a given candidate shape with a higher weighted reference shape, the linked list logic 308 can update the links in the linked list of y0 sorted shapes so that the given candidate shape is no longer references in the linked list by removing its previous and next links. For example, the next other shape to the given candidate shape can have its linkage changed to the shape previous to the given candidate shape and the previous other shape can have its linkage changed to the shape immediately subsequent to the given candidate shape. That is, in such a scenario, the given candidate shape is bypassed in the linked list because no other shapes point to the given candidate shape.

In this way, the number of intersections calculated by the intersection logic 316 can be reduced such that execution of the sweep algorithm can be faster. Moreover, when the given candidate shape is determined to intersect with a higher weighted reference shape, the intersection logic 316 can mark the given candidate shape as hidden such that the cluster labels associated with the given candidate shape are not displayed or visible for the associated viewport parameter of the GUI. Based on the marking of various shapes as hidden or not hidden by the intersection logic 316, the visibility logic 318 can determine whether various associated cluster labels should be visible or hidden (e.g., invisible). The visibility logic 318 can be configured to implement user preferences and/or visibility parameters, such as a quantity of cluster labels that should be displayed for a bounding polygon on the GUI, which in turn is bounded by an associated shape. Other user preferences and/or visibility parameters implemented by the visibility logic 318 can include the font and size of the cluster labels, the characteristics of the polygons, the colors of the polygons and/or clusters, etc.

The rendering logic 320 can be configured to output, display, or send various shapes, polygons, clusters, cluster labels, etc to the remote platform(s) 304 via the network 150. For example, the rendering logic 320 can be configured to render GUIs representing labeled overlapping graphical objects on display screens of user device(s) of the remote platform(s) 304. The rendering logic 320 can cause the shapes not to be visible on the remote platform(s) 304, but polygons corresponding to, bounded by, or indicative of the total set of the shapes can be rendered on the display screens. The rendering logic 320 can receive an indication of or determine a user selected viewport parameter (e.g., zoom percentage) for each user device of the remote platform(s) 304.

The user selected viewport parameter can correspond to a compactness or diffuseness of shapes that can be indicative of how many shapes of the total set of shapes should be present and which corresponding polygons should be visible on the display screen for each user device at the user selected viewport parameter. The rendering logic 320 can receive or determine the visibility parameters for each shape/polygon at the user selected viewport parameter based on whether each shape intersects with a higher weighted shape and/or is marked as hidden. This way, the rendering logic 320 can determine which rendered polygons should have their associated cluster labels rendered. That is, the rendering logic 320 can efficiently determine which cluster labels should be visible for the user selected viewport parameter, which beneficially can significantly increase the rendering, refresh, and zooming rate of the GUI rendered by the rendering logic 320 via the remote platform(s) 304.

The electronic storage 326 can maintain a list of all data and information necessary for execution of the sweep algorithm. For example, the electronic storage 326 can store the linked list, the weight sorted array of shapes, the cluster labels, data being clustered, etc. The data and information stored in the electronic storage 326 is retrievable by the processor(s) 328, such as for execution of the sweep algorithm. Additionally or alternatively, data and information such as some or all of the linked list, the weight sorted array of shapes, the cluster labels, data being clustered, etc can be stored in a backend component such as the external resources 324. In this situation, the processor(s) 328 can send a request to the external resources 324 to request pertinent information for execution of the sweep algorithm.

In some implementations, the computing platform(s) 302, the remote platform(s) 304, and/or the external resources 324 can be operatively linked via one or more electronic communication links. For example, such electronic communication links can be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 can be operatively linked via some other communication media.

A given remote platform 304 can include one or more processors 328 configured to execute computer program logics. The computer program logics can be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 can include one or more of a server, a desktop computer, a laptop computer, a handheld computer, a tablet computing platform, a NetBook, a Smartphone, a gaming console, and/or other computing platforms. The external resources 324 can include sources of information outside of the system 300, external entities participating with the system 300, and/or other resources. In some implementations, some or all of the functionality attributed herein to the external resources 324 can be provided by resources included in system 300.

The computing platform(s) 302 can include the electronic storage 326, the processor(s) 328, and/or other components. The computing platform(s) 302 can include communication lines, or ports to enable the exchange of information with a network and/or other computing platforms. Illustration of the computing platform(s) 302 in FIG. 3 is not intended to be limiting. The computing platform(s) 302 can include a plurality of hardware, software, and/or firmware components operating together to provide the functionality attributed herein to the computing platform(s) 302. For example, the computing platform(s) 302 can be implemented by a cloud of computing platforms operating together as the computing platform(s) 302.

The electronic storage 326 can comprise non-transitory storage media that electronically stores information. The electronic storage media of the electronic storage 326 can include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). The electronic storage 326 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 326 can include one or more virtual storage resources (e.g., cloud storage, a virtual private network, and/or other virtual storage resources). The electronic storage 326 can store software algorithms, information determined by the processor(s) 328, information received from computing platform(s) 302, information received from the remote platform(s) 304, and/or other information that enables the computing platform(s) 302 to function as described herein.

The processor(s) 328 can be configured to provide information processing capabilities in the computing platform(s) 302. As such, the processor(s) 328 can include one or more of a digital processor, an analog processor, a digital circuit designed to process information, an analog circuit designed to process information, a state machine, and/or other mechanisms for electronically processing information. Although the processor(s) 328 is shown in FIG. 3 as a single entity, this is for illustrative purposes only. In some implementations, the processor(s) 328 can include a plurality of processing units. These processing units can be physically located within the same device, or the processor(s) 328 can represent processing functionality of a plurality of devices operating in coordination. Processor(s) 328 can be configured to execute logics 308, 310, 312, 314, 316, 318, 320, and/or other logics. Processor(s) 328 can be configured to execute logics 308, 310, 312, 314, 316, 318, 320, and/or other logics by software; hardware; firmware; some combination of software, hardware, and/or firmware; and/or other mechanisms for configuring processing capabilities on the processor(s) 328. As used herein, the term "logic" can refer to any component or set of components that perform the functionality attributed to the logic. This can include one or more physical processors during execution of processor readable instructions, the processor readable instructions, circuitry, hardware, storage media, or any other components.

It should be appreciated that although the logics 308, 310, 312, 314, 316, 318, and/or 320 are illustrated in FIG. 3 as being implemented via a single processing unit, in implementations in which the processor(s) 328 includes multiple processing units, one or more of the logics 308, 310, 312, 314, 316, 318, and/or 320, can be implemented remotely from other computing systems. The description of the functionality provided by the different logics 308, 310, 312, 314, 316, 318, and/or 320, described herein is for illustrative purposes, and is not intended to be limiting, as any of the logics 308, 310, 312, 314, 316, 318, and/or 320 can provide more or less functionality than is described. For example, one or more of the logics 308, 310, 312, 314, 316, 318, and/or 320 can be eliminated, and some or all of its functionality can be provided by other ones of the logics 308, 310, 312, 314, 316, 318, and/or 320. As another example, the processor(s) 328 can be configured to execute one or more additional logics that can perform some or all of the functionality attributed below to one of the logics 308, 310, 312, 314, 316, 318, and/or 320.

Figure 4B:
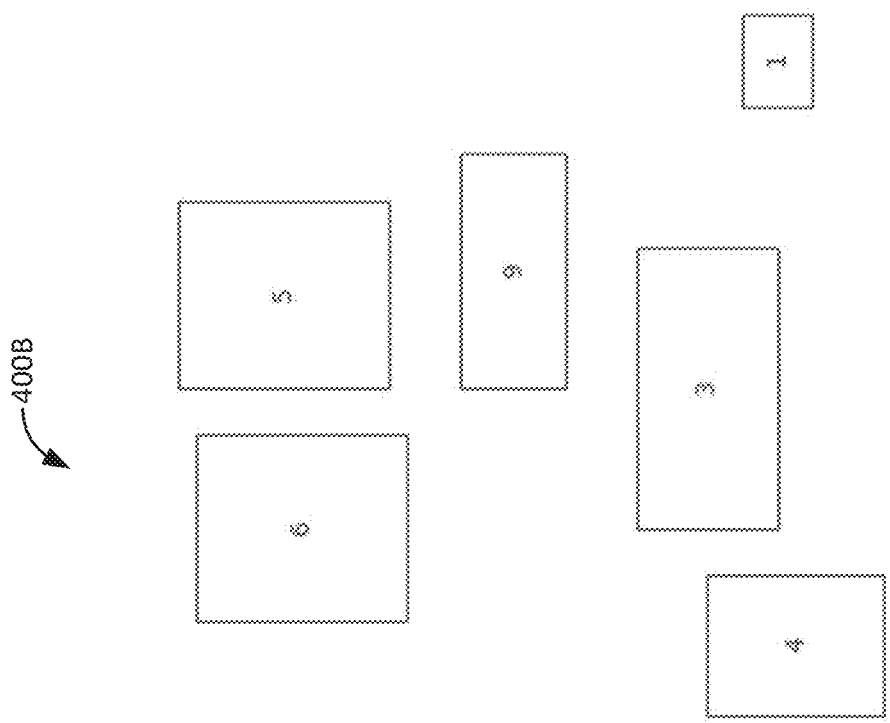
FIGS. 4A-4B are example block diagrams including multiple shapes that can form boundaries surrounding labeled overlapping graphical objects.
Figure 4A:
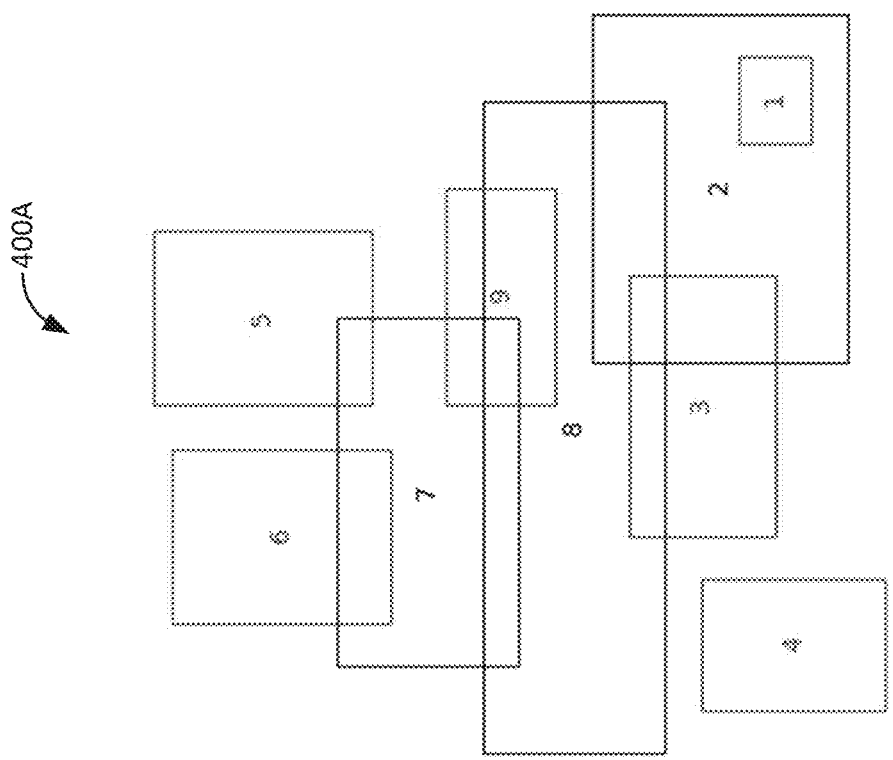

FIGS. 4A-4B are example block diagrams 400A-400B including multiple shapes that can form boundaries surrounding labeled overlapping graphical objects. The first block diagram 400A depicts intersecting multiple shapes and the second block diagram 400B depicts multiple shapes that do not intersect. The shapes can be rectangles, for example, as shown in FIGS. 4A-4B. An improved sweep algorithm can be performed to determine which rectangles are intersecting. The rectangles can be bounding boxes of a quantity of cluster labels. The clusters of the quantity of cluster labels can appear as bounded or roughly bounded by polygons rendered on a graphical user interface (GUI) of a display screen of a user device for visualization of the labeled overlapping graphical objects (e.g., labeled clusters of documents). As an example, each cluster can represent one hundred documents such that there are half a million (i.e., 500,000) rectangles that are subject rectangles for determining rectangle intersections. Advantageously, the sweep algorithm can be performed to determine these intersections and to determine which cluster labels of the quantity of cluster labels should be visible on the GUI.

FIGS. 4A-4B illustrate the application of the sweep algorithm on a set of rectangles with corresponding weights to determine intersections for a multiple rectangles as a subset of the set of rectangles and to determine which rectangles are displayed. That is, the sweep algorithm can be executed by a computing system (e.g., computing platform(s) 302) to determine which cluster labels are visible based on whether the cluster labels are bounded by a rectangle that is visible. Rectangles of the set of rectangles can be visible if there is not a higher weight displayed rectangle that intersects the corresponding rectangle. For application of the sweep algorithm, a list (e.g., doubly linked list) of rectangles defined by positional coordinates $x_0$, $x_1$ on an x-axis and $y_0$ and $y_1$ on the y-axis can be received by the computing system. The doubly linked list can be sorted or ranked by increasing $y_0$ values. The x-axis and y-axis can be defined according to various conventions, such as a convention that the x-axis and y-axis are defined starting from the origin of the GUI screen at the top left. That is, as used herein, the top left portion of the GUI can be considered (0,0) in the (x, y) notation such that $x_0$ and $x_1$ are x values that increase from a 0 value to larger values as the x coordinate increases from left to right along the x-axis and $y_0$ and $y_1$ are y values that increase from a 0 value to larger values as the corresponding y coordinate increases from top to bottom along the y-axis.

The rectangles or shapes can be represented as members of a class of object defined with initial attributes and/or auxiliary fields of $x_0$, $y_0$, $x_1$, $y_1$, an identifier, a weight, a next link, and a previous link. For example, a rectangle can be instantiated as rect(0, 60, 15, 11, 1, 8) with corresponding values for some or all of the initial attributes (e.g., excluding next and previous links). The $x_0$, $y_0$, $x_1$, $y_1$ values for each rectangle can describe the position of each rectangle on the GUI screen. The $x_0$, $y_0$, $x_1$, $y_1$ values can describe the four corners of each rectangle on the GUI screen in which $x_0$ and $y_0$ are the starting x and y positions while $x_1$ and $y_1$ are the ending x and y positions, respectively. The weight assigned to each rectangle can be determined based on a variety of criteria related to the clusters of documents, such as a number of documents represented by the rectangle, document density, and a percentage of the documents fitting a set of parameters. The parameters can be based on set filters or thresholds, such as a quantity of documents of the percentage of documents marked as relevant, a quantity of documents predicted to be relevant, metadata containing information marked as important, number of documents viewed by people, pages above or below a threshold, documents containing words or tokens that match some criteria, etc.

Each of the rectangles (e.g., except for the first rectangle and last rectangle in the list) can have links such as a next link to the next rectangle in the doubly linked list and a previous link to the previous rectangle in the doubly linked list. When a rectangle is marked as hidden (e.g., the rectangle is no longer "open"), the links and index of the doubly linked list are used such that an attempted retrieval of a hidden rectangle can instead link to the rectangle that is immediately prior to or after the hidden rectangle in the linked list. Each of the rectangles can be hashed by an associated identifier for operation of the algorithm. Moreover, each rectangle can be assigned a weight value based on criteria relevant to how the documents are being clustered such as document density, a percentage of the documents fitting a set of parameters, predicted relevance, important metadata, a quantity of viewed documents, a quantity of documents with particular words or tokens etc. as described herein. The sweep algorithm can be used to store all the rectangles as a weight sorted array of rectangles ordered by highest weighted rectangle to lowest weighted rectangle.

The computing system can execute an improved sweep algorithm to output relevant rectangle intersections for the plurality of rectangle that is a subset of the total set of rectangles. Rather than calculating all intersections for each rectangle on a sorted list of rectangles sorted and traversed based on $y_0$ and $y_1$ values, the improved sweep algorithm can be executed faster by only calculating a subset of intersections. The executed sweep algorithm can also output and identify the rectangles that will be hidden based on the relevant rectangle intersections. In addition, the sweep algorithm can involve calculation of a maximum height rectangle defined as the rectangle having the highest difference between its associated $y_0$ and $y_1$ value among all of the rectangles of the set of rectangles.

The maximum height can function as an upper bound on intersection calculations. As an example, if rectangle 6 is a candidate rectangle, rectangle 7 is the maximum height rectangle, and rectangle 9 is a reference rectangle, then rectangle 6 and any previous rectangles to rectangle 6 in the linked list (e.g., rectangle 5 or other hypothetical rectangles having a smaller y0 value than the y0 value of rectangle 6) can be determined not to intersect with rectangle 9. This can be determined by application of the sweep algorithm based on the y0 value of rectangle 6 plus the maximum height being greater than the y0 value of rectangle 9. This means that candidate rectangle 6 and any rectangle having smaller y0 values (e.g., rectangle 6's previous rectangles in the list) cannot possibly intersect with reference rectangle 9 because the only way such intersection would happen is if rectangle 9 had a higher height than rectangle 7, which is not the case because rectangle 7 is the maximum height rectangle. In other words, rectangle 5 is located high above the upper bound represented by the maximum height rectangle so rectangle 5 and rectangle 9 clearly cannot intersect.

FIGS. 4A-4B illustrate an example application of the improved sweep algorithm for sweeping through a particular quantity of example rectangles, such as rectangles indexed from one to nine in terms of identity and weight. The nine rectangles can be sorted in the doubly linked list by their respective $y_0$ values in order of ascending $y_0$ values from the top left origin of the GUI screen to the bottom of the screen. The nine rectangles can also be sorted by their respective assigned weights in the weight sorted array of rectangles in descending order from the highest weighted rectangle. Accordingly, based on the weighted sorted array, the sweep algorithm can start with rectangle 9 which is considered "open" as a current reference shape (e.g., rectangle). Based on the weight sorted array of rectangles, rectangle 9 can be the highest weighed rectangle so that traversal through the rectangles starts with opening rectangle 9. Based on the next and previous links defining links in the doubly linked list, it can be known what previous and next rectangles that a particular rectangle is lined with. As an example, the previous of rectangle 6 can be rectangle 5 while the next of rectangle 6 can be rectangle 7.

From the open rectangle of rectangle 9, the computing system executing the algorithm can search for (e.g., binary search) a rectangle having a $y_0$ value that is greater than and closest to the $y_1$ value of the current reference rectangle 9, which can be rectangle 2, for example. Rectangle 2 and 9 can be compared for determining whether an intersection exists. If rectangle 2 and 9 were determined to intersect, then it would be known that rectangle 9 was assigned a higher weight than 2 and if so (e.g., rectangle 9 is the highest weighted rectangle and clearly higher weight than rectangle 2), then rectangle 2 would be marked as hidden. Rectangles marked are not shown as visible on the GUI screen for their corresponding viewport parameter (e.g., the total set of shapes can be determined for a particular viewport parameter or percentage). If rectangle 2 were marked as hidden in this scenario, then rectangle 2 would be removed from the doubly linked list for future traversals through the linked list during application of the sweep algorithm. For example, based on the y0 sorting, rectangle 2 can have been linked to its previous rectangle 8 and linked to its next rectangle 3 (e.g., subset of linked list as [9↔8↔2↔3↔4]) and the reference links pointing to rectangle are removed based on rectangle 2 being marked as hidden (e.g., subset of linked list changed to [9↔8→3←(2)→8↔3↔4]).

However, because rectangle 2 and 9 do not intersect, the algorithm can proceed to the rectangle that was previous in the linked list (e.g., sorted by $y_0$ values in ascending order), which can be rectangle 8, for example. It can be determined that rectangle 9 intersects with rectangle 8, as can be seen in FIG. 4A. Because rectangle 9 can be higher weight than rectangle 8 (e.g., rectangle 9 is the highest weight rectangle in this example sweep algorithm application scenario), rectangle 8 would be marked as hidden. Accordingly, rectangle 8 would be removed from the doubly linked link. For example, the relevant section of the linked list could be [9↔8↔2] which can be updated to [9→2 and 9←2] with references from 9 and 2 pointing to 2 being removed so that references pointing to rectangle 8 are removed based on rectangle 8 being marked as hidden. Since rectangle 8 would be removed from the linked list, rectangle 8 would not be considered in future iterations/traversals of the linked list during application of the sweep algorithm, which advantageously improves the efficiency and speed of the sweep algorithm. In other words, rectangle 8 can be considered a reference rectangle being removed from the linked list upon completion of iterating using rectangle 8 as the reference rectangle (e.g., iteration can be complete once the rect.prev is none and the rect.next is none).

The algorithm can proceed with a new candidate rectangle to be compared with the reference rectangle 9, such as rectangle 7 (e.g., the previous rectangle to rectangle 9), based on being the next rectangle that has a y0 value that is greater less than and closest to the y0 value of reference rectangle 9. The new candidate rectangle 7 can be compared to a maximum height of all of the set of rectangles initially considered (e.g., rectangles 1 to 9 in the example illustrated by FIG. 4A). For example, the maximum height can be height of rectangle 2 (e.g., the value of $2 \cdot y_1$ minus $2 \cdot y_0$). If the $y_0$ value of the current rectangle plus the maximum height is less than the y0 value of the reference rectangle 9, then traversal through the linked list with the reference rectangle as rectangle 9 can end. For example, the sweep algorithm can proceed with a new reference rectangle such as the next highest weighted rectangle after rectangle 9 until all rectangles have been selected as reference rectangles and/or all necessary rectangle intersection analysis has been performed.

Traversal with reference rectangle 9 can end (and proceed with the new reference rectangle) with new candidate rectangle 6 (after rectangle 7 is the current candidate rectangle) because the $y_0$ values of rectangle 6 combined with the maximum height is still less than the $y_0$ value of rectangle 9, then neither rectangle 6 nor any of the rectangles previous to rectangle 6 (having $y_0$ values smaller than the y0 value of rectangle) can possibly intersect with reference rectangle 9. Accordingly, the evaluation of reference rectangle 9 can terminate in this situation such that traversal through the linked list with the reference rectangle as rectangle 9 can end. A new reference rectangle (e.g., rectangle 6) can be selected unless all rectangles have already been considered as reference rectangles or further analysis is unnecessary. In this way, the computing system can execute the improved sweep algorithm by selecting each rectangle (or a selection of rectangles as desired) of the weight sorted array as the current reference rectangle in turn, comparing the current reference rectangle to each candidate rectangle selected from the y0 sorted doubly linked list, calculating only the rectangle intersections that need to be calculated, and marking rectangles as hidden based on the calculated rectangle intersections and corresponding rectangle weights. The sweep algorithm can proceed with selecting a next reference rectangle to be the current reference rectangle after evaluation of reference rectangle 9 ends, such as selecting or opening the next highest weighted rectangle 6 from the weight sorted array as the current reference rectangle (e.g., since rectangles 7 and 8 are marked hidden and/or de-referenced in the linked list).

The sweep algorithm can then proceed with comparing the open current reference rectangle 6 with candidate rectangles from the sorted doubly linked list. That is, the sweep algorithm can proceed with selecting a next reference rectangle to be the current reference rectangle after evaluation of reference rectangle 9 ends, such as selecting or opening the next highest weighted rectangle that is not marked hidden from the weight sorted array as the current reference rectangle 6. The candidate rectangles can be selected based on a search for (e.g., binary search) a rectangle having a $y_0$ value that is greater than and closest to the $y_1$ value of the current reference rectangle 6 as described above. This way, the algorithm generally can analyze the rectangles in a bottom to top direction or a top to bottom direction, which can enable use of the y0 plus maximum height comparison to avoid excess calculation. This process can repeat until rectangles in the weight sorted array have been selected or used as appropriate. As such, application of the improved sweep algorithm can be used to determine the rectangles that should be visible on the GUI screen, as illustrated by FIG. 4B. Moreover, the improved sweep algorithm can operate faster by not calculating extra rectangle intersections such as calculations of intersections between rectangle 2 to rectangle 8. As an example, the improved sweep algorithm can reduce a quantity of rectangle comparisons by six or some other number depending on the arrangement of rectangles that the improved sweep algorithm is applied to.

FIG. 4B shows that rectangles 6, 5, 9, 4, 3, and 1 can be visible on the GUI screen because they do not intersect with a higher weighted rectangle. The determination that rectangles 6, 5, 9, 4, 3, and 1 do not intersection with another higher weighted rectangle can be based on application of the improved sweep algorithm (e.g., iterating through these rectangles as reference rectangles and/or candidate rectangles and/or comparing the corresponding $y_0$ and/or $y_1$ values of these rectangles with the maximum height rectangle while updating links in the doubly linked list). Stated differently, rectangles 7, 8, and 2 can have been marked as hidden by the algorithm based on the computing system determining that those rectangles intersect with one or more higher weighted rectangles (e.g., rectangle 9, rectangle 3, etc.). Advantageously, execution of the sweep algorithm by the computing system can result in improved frame rendering rate, refresh rate, and zoom rate for the GUI. In particular, the improved sweep algorithm can yield an improved frame rendering rate such as 60 FPS, for example.

Figure 5:
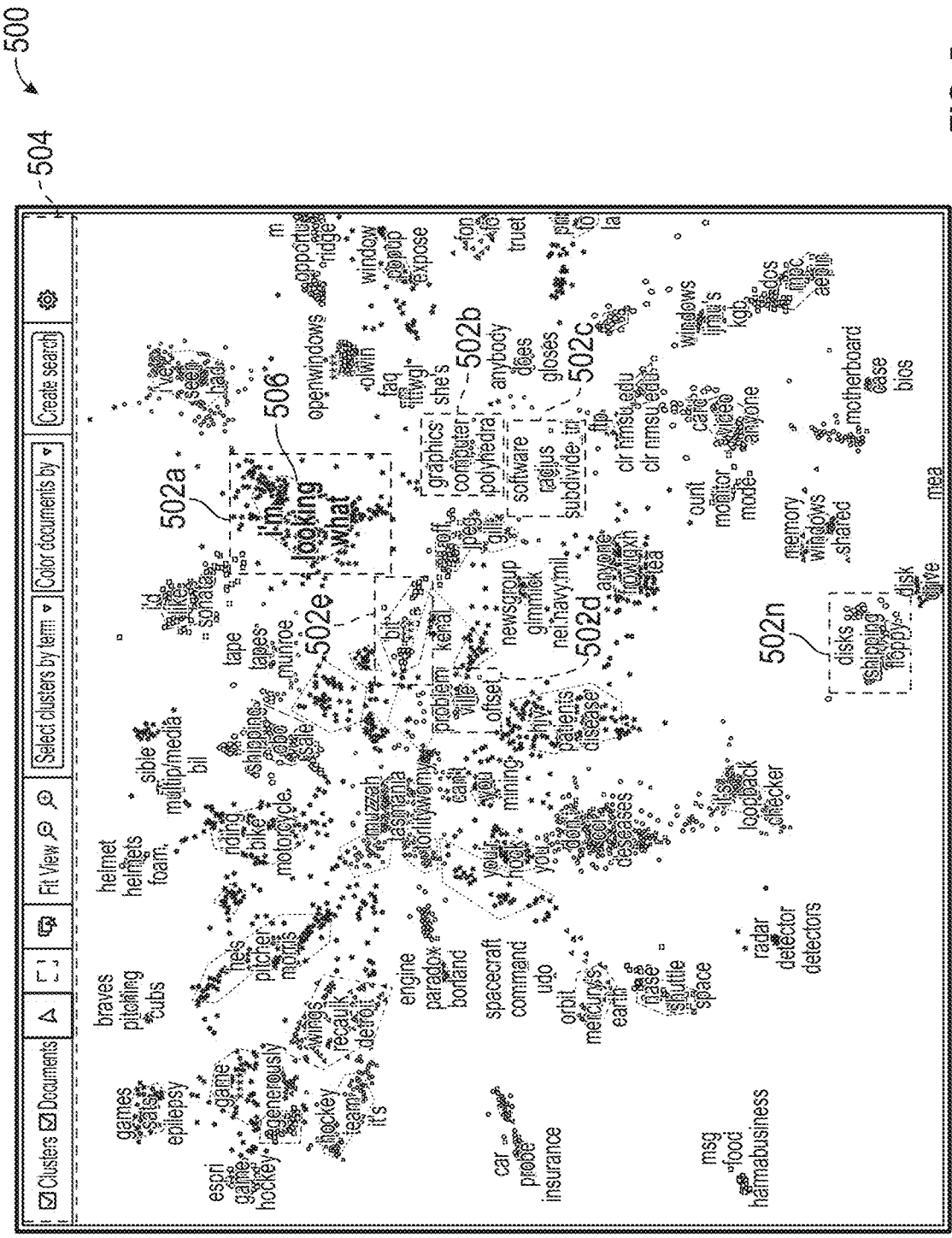
FIGS. 5-7 are example graphical user interfaces of overlapping graphical objects rendered at different viewport parameters.
Figure 6:
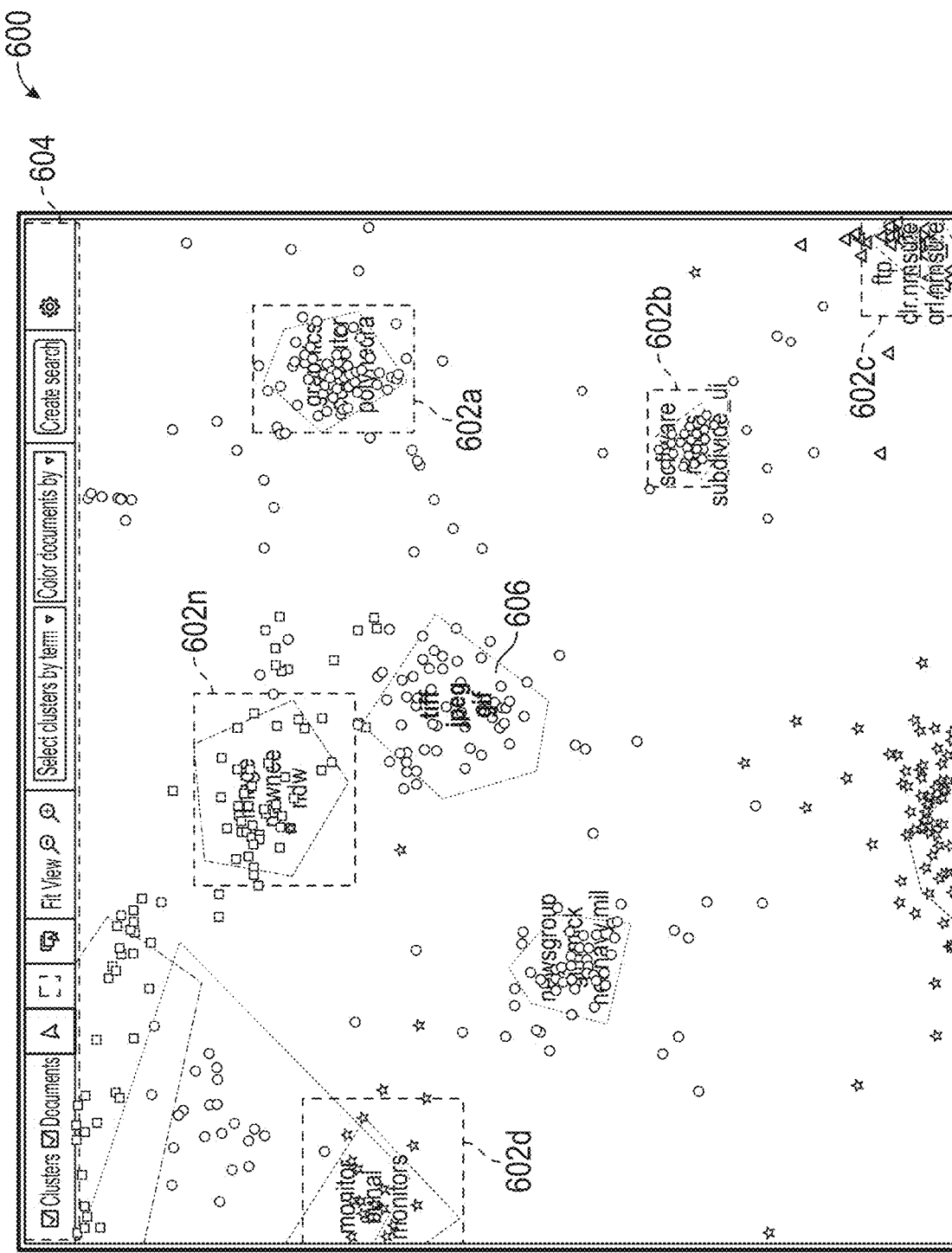
Figure 7:
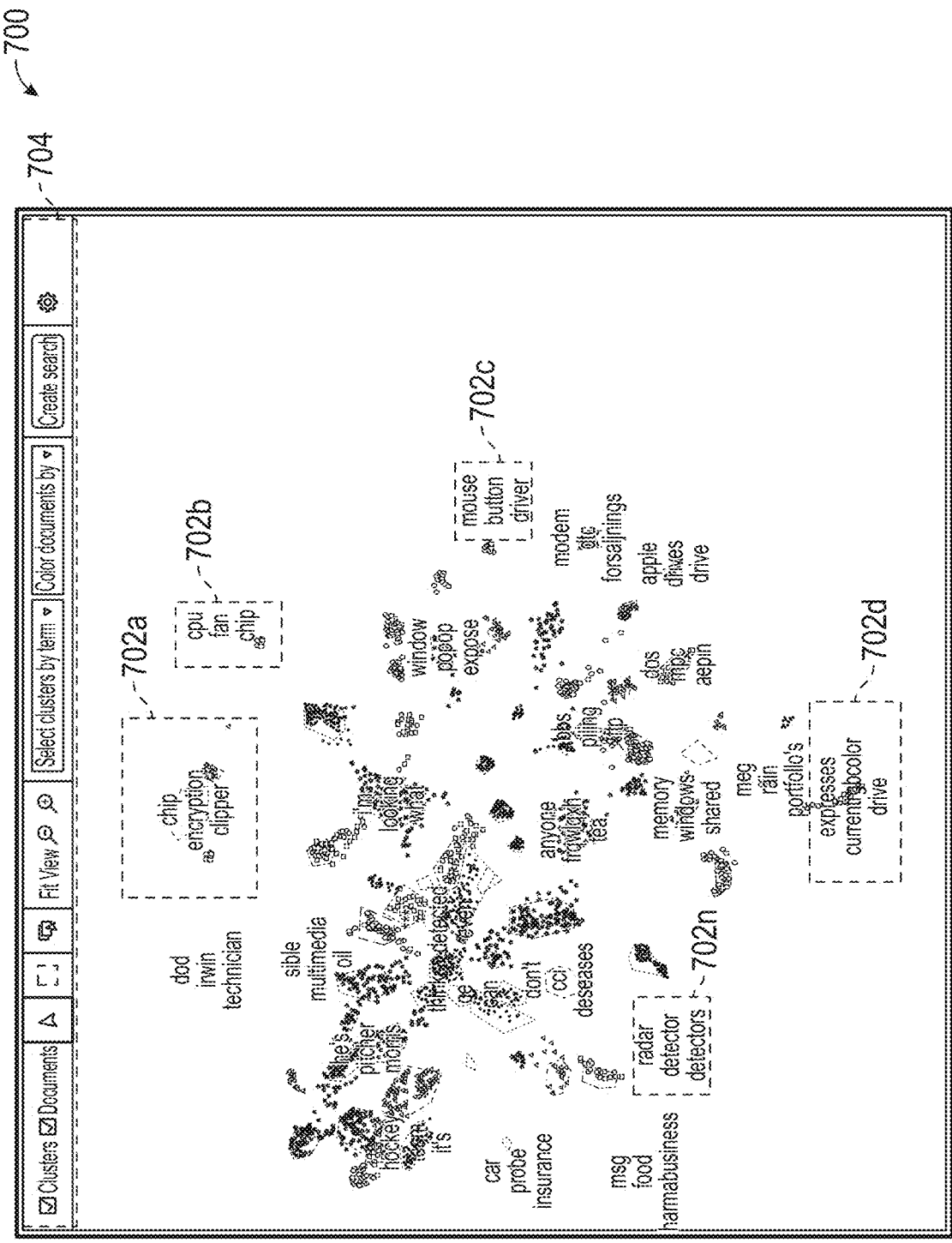

FIGS. 5-7 are example graphical user interfaces 500, 600, 700 of overlapping graphical objects rendered at different viewport parameters. The graphical user interfaces 500, 600, 700 illustrate the overlapping graphical objects at the different viewport parameters, such as the graphical user interface (GUI) 500 showing clusters of documents at a medium viewport parameter, the GUI 600 showing document clusters at a high viewport parameter, and the GUI 700 showing documents clusters at a low viewport parameter. Each document cluster of the document clusters can have a cluster label, which can be visible or not visible. Whether a cluster label is visible on a GUI screen by a computing device depends on whether the output of a sweep algorithm indicates that a corresponding shape should be rendered, as described herein. The shape can be a rectangle that bounds a cluster label, for example. The bounding rectangle can be located within a polygon on the GUI screen. Each polygon can contain multiple clusters, such as three clusters (e.g., in FIGS. 5-7) or some other suitable number of clusters. Each cluster can be associated with one or more cluster labels.

As shown in FIGS. 5-7, multiple polygons can be located about the GUIs 500, 600, 700. Each polygon can contain one or more clusters and their corresponding cluster label(s) if it is determined that the corresponding cluster label(s) should be visible. As an example, each polygon that has visible cluster labels can include three cluster labels being depicted. The bounding rectangles that bound each cluster label shown as visible in the GUIs 500, 600, 700 can be invisible on the GUI screen. As such, the sweep algorithm described herein can be used to determine whether a particular bounding rectangle is rendered or not rendered based on whether the particular bounding rectangle is marked hidden or not (e.g., visible if not marked hidden, invisible if marked hidden due to intersecting with another higher weighted bonding rectangle). Although FIGS. 5-7 show that each cluster is assigned one label in a one to one relationship, clusters could be assigned more than one label as desired. The cluster labels can be labeled information, such as words that describe an aspect of its associated cluster. The words of the cluster labels on a GUI screen can be visible to a user (e.g., viewing the GUI screen via a user device) if the corresponding bounding rectangles are not marked as hidden or the clusters labels can be invisible if the corresponding bounding rectangles are marked as hidden.

The intersections of various rectangles on the GUI screen can be calculated for various discrete or continuous viewport parameters, such as at various zoom percentages defined by the associated viewport parameters. Intersections can be recalculated because the orientation, relative size, position and/or layout of polygons and/or rectangles contained within can change depending on a selected viewport parameter (e.g., selected by the user). As an example, polygons can be more or less dense across the GUI screen. That is, the polygons can be distributed in a more compressed, clumped, or diffuse manner depending on the selected viewport parameter, which can be illustrated by the different viewport parameters of FIGS. 5-7. Moreover, depending on the viewport parameter, the set of polygons visible on the GUI screen can change. Accordingly, the set of corresponding rectangles contained in a weight sorted array of rectangles/shapes and linked list of rectangles/shapes can change. Thus, the output of the sweep algorithm can differ based on the set of input shapes/rectangles. Regardless of what set of rectangles corresponding to selected viewport parameter are input into the sweep algorithm, the sweep algorithm can involve calculation of intersections for a multiple rectangles that are a subset of the total set of input rectangles, which advantageously can increase the speed of rendering and zooming of the GUI screen.

As shown in the GUIs 500, 600, 700 of FIGS. 5-7, a toolbar graphical icon 504, 604, 704 can be provided with the GUIs 500, 600, 700, such as at the top portion of the screen. The toolbar 504, 604, 704 can provide various selectable or configurable options for the user to alter the cluster visualization represented by the GUIs 500, 600, 700 and/or to customize or manipulate the clusters and/or data (e.g., documents) represented by the cluster visualization. For example, the user can check or uncheck a check box to indicate whether clusters and/or documents should be visible in the cluster visualization. Documents can be represented by dots, such as being grouped such that 100 (or some other number) of documents are represented by a dot. The user can move a cursor to hover over a dot to view or analyze what documents are represented. One dot or groups of dots can form a cluster. The various clusters in the GUIs 500, 600, 700 can be represented by corresponding labels, such as words (e.g., wings, recaulk, Detroit).

Labeled clusters that are in the same polygon shape or are close to each other (e.g., in terms of Euclidean distance) can be semantically or otherwise related. As an example, a polygon shape containing the labels HIV, patients, and disease can represent clusters of documents pertaining to the corresponding label and to the overall related theme of healthcare, illness, etc. The toolbars 504, 604, 704 can also provide an option for the user to manipulate the cluster visualization, such as via a mouse cursor, an option to create dotted boxes/windows, etc. As an example, the toolbars 504, 604, 704 can also enable the user to adjust the viewport parameter, such as to adjust the zoom percentage via a "fit view" box that can accept a zoom percentage input or has a "plus magnifying glass icon" or "minus magnifying glass icon" to increase or decrease the zoom percentage. The user could also scroll up or down via a mouse, trackpad, or other input device to adjust the zoom percentage. As an example, the toolbars 504, 604, 704 can enable the user to select a subset of clusters shown on the GUIs 500, 600, 700. For example, the user can select from a drop down bar to select a plurality of search options, including an option to select clusters by term (e.g., the labeled word).

The toolbars 504, 604, 704 can enable the user to select from a plurality of color coding options. For example, the user can select to color documents by red, green, blue, etc via a drop down menu. The clusters can be color coded according to their corresponding constituent documents or based on another color scheme. As an example, the clusters can be a color that is a darker or lighter shade of the document dots that are generally contained within the clusters. That is, dots representing documents can generally fall within a polygon shape representing clusters but some dots can fall outside the polygon shape, which could denote that they are not as relevant to the associated cluster label as those dots located within the associated cluster label or polygon shape. The toolbars 504, 604, 704 can also enable the user to perform a search for a subset of documents or clusters. The search can be based on a larger universe of documents or clusters represented in the GUIs 500, 600, 700. The toolbars 504, 604, 704 can also enable the user to select other GUI settings as denoted by the gear icon in the toolbars 504, 604, 704. Each of the GUIs 500, 600, 700 can include a plurality of polygons 502a-502n, 602a-602n. 702a-702n, located about the respective GUI screen. The polygons 502a-502n, 602a-602n, 702a-702n can bound one or more clusters. Also, the polygons 502a-502n, 602a-602n, 702a-702n can contain cluster labels bounded by shapes (e.g., rectangles).

For example, the polygons 502a-502n, 602a-602n, 702a-702n each show three cluster labels or have hidden labels. The labels can be descriptive of the associated clusters of documents. The cluster labels contained within one of the polygons 502a-502n. 602a-602n, 702a-702n can be related, such as a polygon containing labels radar, detector, and detector all pertaining to radar sensors. Polygons 502a-502n, 602a-602n. 702a-702n containing related cluster labels can be located close to each other. As an example, the polygons 502b, 502c are located to each other based on both being related to computer graphics (e.g., the polygon 502b, 602a has cluster labels graphics, computer, and polyhedral while the polygon 502c. 602b has cluster labels software, radius, and subdivide.tri).

The user can move an input marker 506, 606 such as a cursor (e.g., can appear as a hand) navigable about the GUIs

500, 600, 700 in order to view, evaluate, analyze, etc information about the corresponding GUI element. For example, the user can hover over a cluster label to learn more about the associated cluster and documents contained within. The GUI 500 can be a medium viewport parameter close to a default zoom percentage (e.g., 100%) such that many polygons appear and are generally not particularly compressed or diffuse. The GUI 600 can be a high viewport parameter close to a high zoom percentage (e.g., 500%) such that few polygons appear and are fairly diffusely located. The GUI 700 can be a low viewport parameter close to a low zoom percentage (e.g., 10%) such that many polygons appear and are fairly compressed.

More or less of the cluster labels can be visible or hidden depending on the number of rectangle intersections, which can depend on how diffuse or compressed the polygons 502a-502n. 602a-602n, 702a-702n are. As an example, the polygon compression in GUI 700 can be higher than GUI 500 and much higher than in GUI 600. The level of polygon compression can correspond to how many rectangle intersections exist. As discussed above, a subset of the number of total rectangle intersections for a set of shapes/rectangles can be determined by the sweep algorithm to determine which corresponding cluster labels should be hidden or not hidden. Because the sweep algorithm disclosed herein can determine which cluster labels should be marked hidden or not hidden in a faster manner, the GUIs 500, 600, 700 can be rendered at a higher frame rate and rendering rate. Moreover, as the user modifies the viewport parameter or percentage of the GUI screen, the GUIs 500, 600, 700 (or other GUI at different viewport parameters) can achieve a faster zoom modulation effect (e.g., rendering the GUI screen as the viewport parameter changes).

Figure 8:
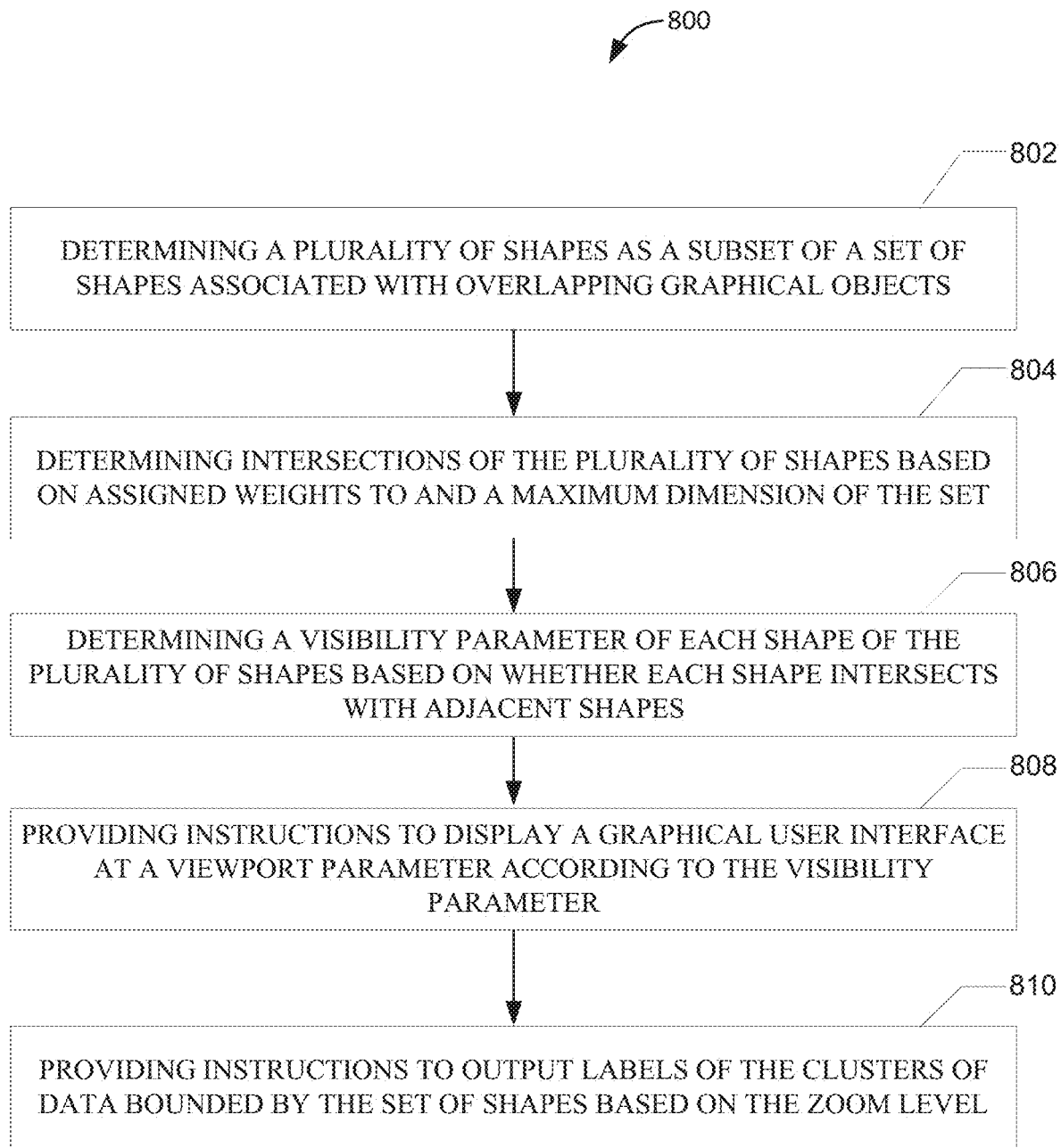
FIG. 8 is an example flow diagram for outputting data clusters via a computing platform, according to certain aspects of the present invention.

FIG. 8 illustrates an example flow diagram (e.g., process 800) for sending content via a computing platform, according to certain aspects of the disclosure. For explanatory purposes, the example process 800 is described herein with reference to one or more of the figures above. Further for explanatory purposes, the blocks of the example process 800 are described herein as occurring in serial, or linearly. However, multiple instances of the example process 800 can occur in parallel, overlapping in time, almost simultaneously, or in a different order from the order illustrated in method 800. In addition, the blocks of the example process 800 need not be performed in the order shown and/or one or more of the blocks of the example process 800 need not be performed. For purposes of explanation of the subject technology, the process 800 will be discussed in reference to one or more figures above. As an example, the process 800 can be performed at least partially by or via the exemplary network architecture 100 in FIG. 1, the example computing network 200 in FIG. 2, the example computer system 300 in FIG. 3, or the example computer system 900 in FIG. 9 described below. Accordingly, at least some of the steps in process 800 can be performed by a processor executing commands stored in the example computing platform(s) 302, for example.

At step 802, a plurality of shapes can be determined as a subset of a set of shapes that are associated with the overlapping graphical objects. According to an aspect, determining the plurality of shapes as the subset of the set of shapes comprises excluding a shape of the set of shapes from traversal of a linked list of the set of shapes based on the maximum height, an x position of the shape, a y position of the shape, a previous shape in the linked list, and a next shape in the linked list. For example, there can be two x positions (e.g., $x_0$ and $x_1$) and two y positions (e.g., $y_0$ and $y_1$). According to an aspect, determining the plurality of shapes as the subset of the set of shapes comprises determining a starting position and an ending position for iterative traversal of a linked list of the set of shapes and determining the plurality of shapes as the subset of the set of shapes based on skipping shapes of the set of shapes during traversal.

At step 804, intersections of the plurality of shapes can be determined based on weights assigned to each shape of the set of shapes and based on a maximum dimension of the set of shapes. According to an aspect, determining the intersections of the plurality of shapes comprises: determining the weights assigned to each shape of the plurality of shapes based on at least one of: a quantity of clusters associated with the plurality of shapes, a density of the data of the clusters, a percentage of data associated with a parameter; determining an order ranking of the plurality of shapes based on the weights assigned to each shape of the plurality of shapes; and calculating intersections of shapes of the plurality of shapes in a descending order from highest ranked shapes of the order ranking to lowest ranked shapes of the order ranking. According to an aspect, determining the intersections of the plurality of shapes comprises determining a portion of the set of shapes that can be skipped during a subsequent traversal of a linked list of the set of shapes.

At step 806, a visibility parameter of each shape of the plurality of shapes can be determined based on whether each shape intersects with one or more other shapes of the plurality of shapes. According to an aspect, determining the visibility parameter of each shape comprises determining a portion of intersecting shapes that have higher or lower assigned weights, wherein intersections are defined according to corresponding x-axis and y-axis positions of the intersecting shapes. According to an aspect, determining the visibility parameter of each shape comprises determining a quantity of hidden shapes of the set of shapes that are hidden at the viewport parameter of the graphical user interface based on intersecting with a higher weighted shape of the plurality of shapes. As an example, determining the visibility parameter can involve causing a lower weight rectangle to be visible even if intersecting with a higher weight rectangle when the higher weight rectangle was already marked as hidden.

At step 808, instructions to display the graphical user interface at a viewport parameter according to the visibility parameter can be provided. At step 810, instructions to output labels of the overlapping graphical objects bounded by the set of shapes based on the viewport parameter of the graphical user interface can be provided. According to an aspect, providing instructions to output the labels of the overlapping graphical objects comprises determining, at the viewport parameter, whether a cluster label appears or disappears based on the corresponding visibility parameter of the corresponding shape of the plurality of shapes that the cluster label is associated with. As an example, the set of shapes comprise a multiple rectangles stored in a linked list (e.g., doubly linked list) having auxiliary fields comprising at least one of: an identifier field, a weight field, a next field, or a previous field and wherein the multiple rectangles correspond to the overlapping graphical objects.

According to an aspect, the process 800 can further include receiving a linked list of the set of shapes associated with the overlapping graphical objects. For example, the set of shapes are defined according to a two dimensional Cartesian coordinate system. According to an aspect, the process 800 can further include calculating the maximum height of the set of shapes used to render the graphical user interface. According to an aspect, the process 800 can further include sorting the linked list of the set of shapes based on the weights assigned to each shape of the plurality of shapes and a starting y position of each shape of the plurality of shapes. According to an aspect, the process 800 can further include determining a starting position for traversal of the linked list based on a highest weight of the weights and a y position (e.g., a minimum y0 value that is greater than a y1 value of a current reference rectangle). According to an aspect, the process 800 can further include iterating through the linked list to determine intersections between two or more shapes of the plurality of shapes.

Figure 9:
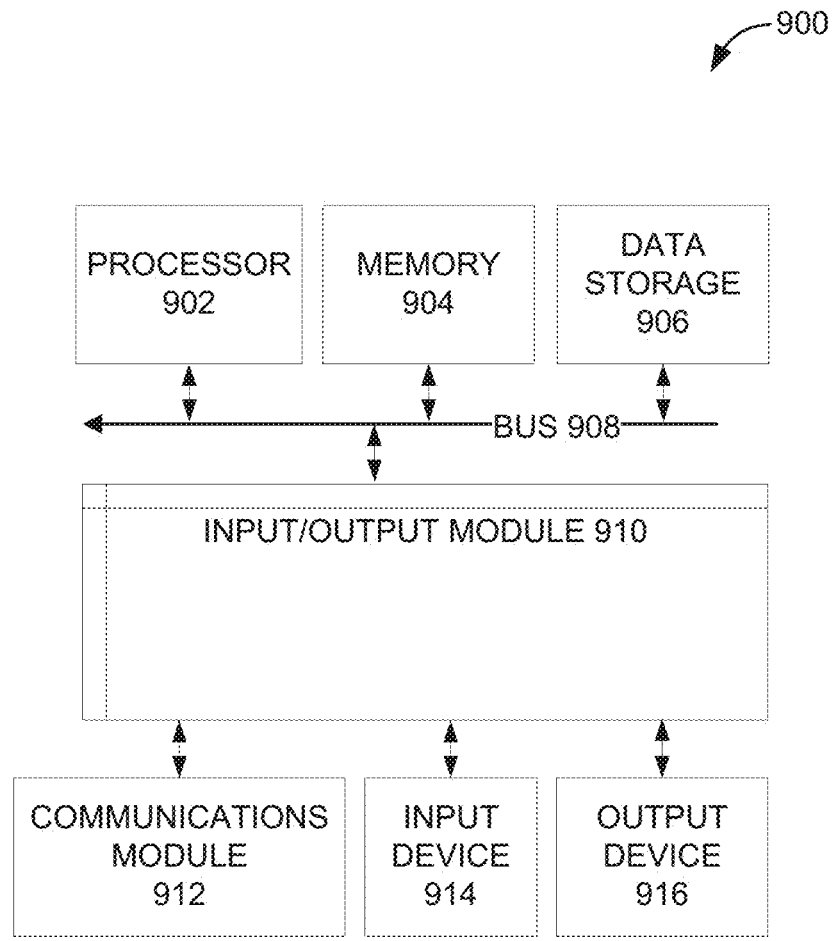
FIG. 9 is a block diagram illustrating an example computer system in which aspects of the present invention can be implemented.

FIG. 9 is a block diagram illustrating an exemplary computer system 900 with which aspects of the present invention can be implemented. In certain aspects, the computer system 900 can be implemented using hardware or a combination of software and hardware, either in a dedicated server, integrated into another entity, or distributed across multiple entities.

The computer system 900 includes a bus 908 or other communication mechanism for communicating information, and processors 902 (e.g., a CPU, GPU, etc.) coupled with bus 908 for processing information. By way of example, the computer system 900 can be implemented with one or more processors 902. The processor 902 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 900 can include, in addition to hardware, code that creates an execution environment for the computer program in question, for example, code that constitutes processor firmware, a protocol stack, a database management system, an operating system, or a combination of one or more of them stored in an included memory 904 (e.g., memory 220a-220b), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to the bus 908 for storing information and instructions to be executed by processor 902. The processor 902 and the memory 904 can be supplemented by, or incorporated in, special purpose logic circuitry.

According to embodiments of the present invention, the computing system 900 can execute code to select prioritized and overlapping graphical elements so as to present elements without overlap fast enough to provide smooth motion video as the elements move. The instructions can be stored in the memory 904 and implemented in one or more computer program products, i.e., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBasc), system languages (e.g., C, Objective-C, C++, Assembly), architectural languages (e.g., Java, .NET), and application languages (e.g., PHP, Ruby, Perl, Python). Instructions can also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 can also be used for storing temporary variables or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 900 further includes a data storage device 906 such as a magnetic disk or optical disk, coupled to bus 908 for storing information and instructions. Computer system 900 can be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present invention, the computing platform 100 and the architecture 300 can be implemented using a computer system 900 in response to processor 902 executing one or more sequences of one or more instructions contained in memory 904. Such instructions can be read into memory 904 from another machine-readable medium, such as data storage device 906. Execution of the sequences of instructions contained in the main memory 904 causes processor 902 to perform the process steps described herein. One or more processors in a multiprocessing arrangement can also be employed to execute the sequences of instructions contained in memory 904. In alternative aspects, hard-wired circuitry can be used in place of or in combination with software instructions to implement various aspects of the present invention. Thus, aspects of the present invention are not limited to any specific combination of hardware circuitry and software.

In the detailed description herein, numerous specific details are set forth to provide a full understanding of the present invention. It will be apparent, however, to one ordinarily skilled in the art, that the embodiments of the present invention can be practiced without some of these specific details. In other instances, well-known structures and techniques have not been shown in detail so as not to obscure the disclosure.

The techniques described herein can be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 900 can include clients and servers. A client and server are generally remote from each other and typically interact through a communication network. The relationship of client and server arises by virtue of computer programs running on the respective computers and having a client-server relationship to each other. The computer system 900 can be, for example, and without limitation, a desktop computer, laptop computer, or tablet computer. The computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 902 for execution. Such a medium can take many forms, including, but not limited to, non-volatile media, volatile media, and transmission media. Non-volatile media include, for example, optical or magnetic disks, such as the data storage device 906. Volatile media include dynamic memory, such as the memory 904. Transmission media include coaxial cables, copper wire, and fiber optics, including the wires that comprise the bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what can be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing can be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for outputting overlapping graphical objects via a graphical user interface, the method comprising:
   determining a plurality of shapes having weights assigned to each shape of the plurality of shapes and a maximum dimension of the plurality of shapes, wherein each shape is defined by y0 and y1 values corresponding to an upper edge and a lower edge of each shape relative to an origin on the graphical user interface;
   generating, based on the weights, a weight sorted array of shapes in a descending order from a highest ranked shape to a lowest ranked shape, wherein the highest ranked shape has a highest weight in the weight sorted array of shapes;
   generating, based on the y0 value assigned to each shape, a double linked list of shapes in an ascending order of their y0 values;
   determining a visibility parameter for each shape of the plurality of shapes by:
      selecting a reference shape from the weight sorted array of shapes starting with the highest ranked shape;
      traversing at least a portion of the double linked list to determine intersections, wherein the traversal starts at a candidate shape in the double linked list having a y0 value greater than but closest to a y1 value of the reference shape;
      removing shapes from the double linked list based on the intersections, wherein the removed shapes are not used in a further traversal of the double linked list;
      updating a visibility parameter for one or more shapes based on the intersections and the weights; and
      advancing to a next shape of the weight sorted array of shapes;
   providing instructions to display the graphical user interface at a viewport parameter according to the visibility parameter; and
   providing instructions to output labels of the overlapping graphical objects bounded by the plurality of shapes based on the viewport parameter of the graphical user interface.

2. The computer-implemented method of claim 1, wherein determining the intersections is:
   based on the maximum dimension, the y0 and y1 values of the reference shape and the candidate shape, a previous shape in the double linked list, and a next shape in the double linked list.

3. The computer-implemented method of claim 2, wherein determining the visibility parameter for each shape of the plurality of shapes further comprises:
   determining, for the reference shape, a starting position and an ending position for iterative traversal of the double linked list of shapes; and
   skipping one or more shapes residing outside the starting position and the ending position of the double linked list of shapes during traversal.

4. The computer-implemented method of claim 1, further comprising:
   determining the weights assigned to each shape of the plurality of shapes based on at least one of: a quantity of clusters associated with the plurality of shapes, a density of data in the clusters, and a percentage of data associated with a parameter.

5. The computer-implemented method of claim 1, wherein the maximum dimension corresponds to a shape, among the plurality of shapes, having a largest difference between its y0 and y1 values.

6. The computer-implemented method of claim 1, wherein determining the visibility parameter of each shape comprises determining a portion of intersecting shapes that have higher or lower assigned weights, wherein the intersections are defined according to corresponding x-axis and y-axis positions of the intersecting shapes.

7. The computer-implemented method of claim 1, wherein determining the visibility parameter of each shape comprises determining, based on intersecting with a higher weighted shape of the plurality of shapes, a quantity of hidden shapes of the plurality of shapes that are hidden according to the viewport parameter of the graphical user interface.

8. The computer-implemented method of claim 1, wherein providing instructions to output the labels of the overlapping graphical objects comprises determining, at the viewport parameter, whether a cluster label appears or disappears based on the corresponding visibility parameter of the corresponding shape of the plurality of shapes that the cluster label is associated with.

9. The computer-implemented method of claim 1, wherein the plurality of shapes are defined according to a two-dimensional Cartesian coordinate system, and wherein the computer-implemented method further comprises:
   calculating, based on x-axis and y-axis positions of the plurality of shapes on the two-dimensional Cartesian coordinate system, the maximum dimension of the plurality of shapes used to render the graphical user interface.

10. The computer-implemented method of claim 1, wherein the plurality of shapes comprise a plurality of rectangles stored in the double linked list having auxiliary fields comprising: an identifier field, a weight field, a next field, and a previous field and wherein the plurality of rectangles correspond to the overlapping graphical objects.

11. A system for outputting overlapping graphical objects via a graphical user interface, comprising:
   one or more processors; and
   a memory including instructions stored thereon, which when executed by the one or more processors, causes the one or more processors to perform:
      determining a plurality of shapes having weights assigned to each shape of the plurality of shapes and a maximum dimension of the plurality of shapes, wherein each shape is defined by y0 and y1 values corresponding to an upper edge and a lower edge of each shape relative to an origin on the graphical user interface;
      generating, based on the weights, a weight sorted array of shapes in a descending order from a highest ranked shape to a lowest ranked shape, wherein the highest ranked shape has a highest weight in the weight sorted array of shapes;
      generating, based on the y0 value assigned to each shape, a double linked list of shapes in an ascending order of their y0 values;
      determining a visibility parameter for each shape of the plurality of shapes by:
         selecting a reference shape from the weight sorted array of shapes starting with the highest ranked shape;
         traversing at least a portion of the double linked list to determine intersections, wherein the traversal starts at a candidate shape in the double linked list having a y0 value greater than but closest to a y1 value of the reference shape;

removing shapes from the double linked list based on the intersections, wherein the removed shapes are not used in a further traversal of the double linked list;

updating a visibility parameter for one or more shapes based on the intersections and the weights; and advancing to a next shape of the weight sorted array of shapes;

providing instructions to display the graphical user interface at a viewport parameter according to the visibility parameter; and providing instructions to output labels of the overlapping graphical objects bounded by the plurality of shapes based on the viewport parameter of the graphical user interface.

12. The system of claim 11, further comprising stored sequences of instructions, which when executed by the one or more processors, cause the one or more processors to perform:

determining the intersections based on the maximum dimension, the y0 and y1 values of the reference shape and the candidate shape, a previous shape in the double linked list, and a next shape in the double linked list.

13. The system of claim 12, wherein the instructions that cause the one or more processors to perform determining the visibility parameter for each shape of the plurality of shapes by:

determining, for the reference shape, a starting position and an ending position for iterative traversal of the double linked list; and skipping one or more shapes residing outside the starting position and the ending position of the double linked list of shapes during traversal.

14. The system of claim 11, wherein the instructions that cause the one or more processors to perform:

determining the weights assigned to each shape of the plurality of shapes based on at least one of: a quantity of clusters associated with the plurality of shapes, a density of data in the clusters, and a percentage of data associated with a parameter.

15. The system of claim 11, the maximum dimension corresponds to a shape, among the plurality of shapes, having a largest difference between its y0 and y1 values.

16. The system of claim 11, wherein the instructions that cause the one or more processors to perform determining the visibility parameter of each shape by:

determining a portion of intersecting shapes that have higher or lower assigned weights, wherein the intersections are defined according to corresponding x-axis and y-axis positions of the intersecting shapes.

17. The system of claim 11, wherein the instructions that cause the one or more processors to perform determining the visibility parameter of each shape by:

determining, based on intersecting with a higher weighted shape of the plurality of shapes, a quantity of hidden shapes of the plurality of shapes that are hidden according to the viewport parameter of the graphical user interface.

18. The system of claim 11, wherein the instructions that cause the one or more processors to perform providing instructions to output the labels of the overlapping graphical objects by:

determining, at the viewport parameter, whether a cluster label appears or disappears based on the corresponding visibility parameter of the corresponding shape of the plurality of shapes that the cluster label is associated with.

19. The system of claim 11, wherein the plurality of shapes are defined according to a two-dimensional Cartesian coordinate system, and the system further comprising stored sequences of instructions, which when executed by the one or more processors, cause the one or more processors to perform:

calculating, based on x-axis and y-axis positions of the plurality of shapes on the two-dimensional Cartesian coordinate system, the maximum dimension of the plurality of shapes used to render the graphical user interface.

20. A non-transitory computer-readable storage medium comprising instructions stored thereon, which when executed by one or more processors, cause the one or more processors to perform operations for outputting overlapping graphical objects via a graphical user interface, comprising:

determining a plurality of shapes having weights assigned to each shape of the plurality of shapes and a maximum dimension of the plurality of shapes, wherein each shape is defined by y0 and y1 values corresponding to an upper edge and a lower edge of each shape relative to an origin on the graphical user interface;

generating, based on the weights, a weight sorted array of shapes in a descending order from a highest ranked shape to a lowest ranked shape, wherein the highest ranked shape has a highest weight in the weight sorted array of shapes;

generating, based on the y0 value assigned to each shape, a double linked list of shapes in an ascending order of their y0 values;

determining a visibility parameter for each shape of the plurality of shapes by:

selecting a reference shape from the weight sorted array of shapes starting with the highest ranked shape;

traversing at least a portion of the double linked list to determine intersections, wherein the traversal starts at a candidate shape in the double linked list having a y0 value greater than but closest to a y1 value of the reference shape;

removing shapes from the double linked list based on the intersections, wherein the removed shapes are not used in a further traversal of the double linked list;

updating a visibility parameter for one or more shapes based on the intersections and the weights; and advancing to a next shape of the weight sorted array of shapes;

providing instructions to display the graphical user interface at a viewport parameter according to the visibility parameter; and providing instructions to output labels of the overlapping graphical objects bounded by the plurality of shapes based on the viewport parameter of the graphical user interface.

* * * * *